US005565909A

United States Patent [19]
Thibadeau et al.

[11] Patent Number: 5,565,909
[45] Date of Patent: Oct. 15, 1996

[54] METHOD OF IDENTIFYING SET-TOP RECEIVERS

[75] Inventors: Robert Thibadeau; Joseph M. Newcomer; David Touretzky, all of Pittsburgh, Pa.

[73] Assignee: Television Computer, Inc., Pittsburgh, Pa.

[21] Appl. No.: 191,675

[22] Filed: Feb. 3, 1994

Related U.S. Application Data

[63] Continuation-in-part of Ser. No. 937,641, Aug. 31, 1992, Pat. No. 5,432,542.

[51] Int. Cl.$^6$ ........................................... H04N 7/16
[52] U.S. Cl. ........................... 348/9; 348/6; 455/4.2
[58] Field of Search ............................... 348/9, 8, 6, 460, 348/461, 465, 473, 478, 1, 2, 12, 13, 7; 358/86, 85, 84; 455/4.1, 4.2, 5.1, 6.1; H04N 7/16

[56] References Cited

U.S. PATENT DOCUMENTS

| | | | |
|---|---|---|---|
| 3,993,955 | 11/1976 | Belcher et al. | 325/308 |
| 4,155,042 | 5/1979 | Permut et al. | 348/9 |
| 4,323,921 | 4/1982 | Guillou | 358/114 |
| 4,450,477 | 5/1984 | Lovett | 358/86 |
| 4,600,921 | 7/1986 | Thomas | 348/6 |
| 4,602,279 | 7/1986 | Freeman | 348/473 |
| 4,677,686 | 6/1987 | Hustig et al. | 455/5 |
| 4,829,372 | 5/1989 | McCalley et al. | 358/86 |
| 4,868,866 | 9/1989 | Williams, Jr. | 380/49 |
| 5,036,537 | 7/1991 | Jeffers et al. | 348/1 |
| 5,070,404 | 12/1991 | Bullock et al. | 358/142 |
| 5,155,591 | 10/1992 | Wachob | 348/9 |
| 5,260,778 | 11/1993 | Kauffman et al. | 348/9 |

*Primary Examiner*—John K. Peng
*Assistant Examiner*—Chris Grant
*Attorney, Agent, or Firm*—Eckert Seamans Cherin & Mellott

[57] ABSTRACT

Location specific messages or programming are generally broadcast and selectively filtered by user terminals which have encoded one or more arbitrary locations of interest. The area surrounding a user, a remote location, a route to be travelled, or the like may be selected for receipt of local warnings, local commercial messages, and the like. A set-top receiver being a preferably tunable apparatus capable of receiving digital information transmitted by a variety of means. Transmitted messages contain information targeted to geographical groups of users, with location designation coding accompanying location-specific messages. A geographic location selection code is entered into a data processor coupled to the user's receiver to define the user's selected location(s) of interest. The processor receives the information segment and its designation code and compares the designated location to the selected one. Segments where the designated and selected points or areas overlap are processed. e.g., being displayed, stored or used to trigger a warning. The user's selection code is variable and plural locations can be used and prioritized. Preferably, regions are encoded by their boundaries, e.g., in longitude, latitude, altitude or the like, and in absolute or relative coordinates, and shorthand designations can refer to stored definitions of areas. Filtering segments based on message content, prioritizing the messages and additional features can be included. The system is especially useful for distributing local commercial messages, hazard warnings, or the like.

26 Claims, 15 Drawing Sheets

5,565,909

METHOD OF IDENTIFYING SET-TOP RECEIVERS

CROSS REFERENCE TO RELATED APPLICATION

This is a continuation in part of application Ser. No. 07/937,641, filed Aug. 31, 1992, now U.S. Pat. No. 5,432,542.

1. Field of the Invention

This invention relates to encoding an identification of a receiving unit associated with a television, radio, or other receiver, or terminal coupled to an information distribution network, to enable the receiver or terminal to select desired data from a generally broadcast stream of information and/or programming. This form of receiver or terminal may include a data processor incorporated in a receiver for showing audio and/or video information, or may be a separate unit, the typical application being a separate set-top interface unit which is coupled between the source of a television broadcast signal (e.g., via cable) and a television for displaying the video and audio information on a selected channel.

2. Prior Art

In the past, a set-top unit was rendered distinct from other set-top units coupled to a distribution network, if it was distinct at all, by a unique serial number ("unique ID"), such as discussed for example in U.S. Pat. No. 5,070,404—Bullock et al., by assignment of unique frequency or other dedicated channel means as discussed for example in U.S. Pat. No. 4,450,477—Lovett, or by another aspect which allows the set-top unit to process information directed to it and to ignore information directed to other set-top units on the distribution network. Alternatively, the set-top unit could be provided with a decryption means which was lacking in other units, thereby distinguishing at least a subset of set-top units such as subscribers to a premium cable channel or the like. This uniqueness of the set-top unit allowed for services such as pay-for-play, subscription services, and digital information subscriptions to be directed by unique ID, frequency, and the like to the paying subscribers, while other subscribers who declined such services could remain coupled to the network but could not process the respective signal.

However, if services need to be distributed according to a class of subscribers other than those addressed by their unique identifiers, channels or hardware, it is not readily possible to distinguish among the set-top units such that some can decode the broadcast and others ignore it. For example, there is no way to use pre-ordained distinctions of this type as a means to direct broadcast messages to classes of subscribers based on selected locations, unless the locations are cross-referenced to the unique identifier or the like, which is cumbersome. For information services, video messages and various other uses, it would be desirable to allow a user of a set-top unit to filter information from the service based upon proximity of the user to the service, or based on the user's selection of a location which may be or may include an area remote from the unit, which otherwise is of interest to the user. Examples of other locations of interest could include, for example, a place of business, a travel destination or route, the location of a loved one, or other location.

The present invention provides a means for identifying a television receiver, or the like based on location, and also for encoding other location information, whereby generally broadcast messages or programming can be filtered and processed by only the users having an interest in the information due to proximity. In this respect, the encoding of information applies both to location specific digital information contained in the broadcast, and location selection information which is preferably input to the system by the user, including but not limited to the location of the receiver itself.

Transmission of digital information over existing carriers as a supplement to conventional broadcasting has been available for many years. Examples are such systems as TeleText and closed captioning. These systems all use custom decoders to make a limited amount of specific information available to all receivers, but only the subscribers can use it. Typically the amount of data transmitted is limited by the fact that the digital information is embedded in a single channel with the general broadcast. For example, TeleText and closed captioning are typically encoded during the vertical retrace period of the video signal. A single line of text characters, or at most a screen of text characters, are stored and displayed.

Alternative methods for limiting access to information and/or the ability to process the information include the use of entitlement messages (e.g., U.S. Pat. No. 4,868,866—Williams), unique message identification (U.S. Pat. No. 4,829,372—McCalley), frequency multiplexing (U.S. Pat. No. 4,677,686—Hustig and U.S. Pat. No. 4,450,477—Lovett), and encryption (U.S. Pat. No. 4,323,921—Guillou). Although these devices permit selection of a subset of users who can use a generally broadcast message, their application to filtering information based upon arbitrary locations or ranges of locations are limited due to the need to define locations and to convert such information into the very different methods by which the users are rendered distinct from one another.

Limitations of the prior art techniques for distinguishing users with respect to selected locations or proximities are inherent in the type of distinguishing technique used. For example, when entitlement messages are used, an entitlement message for every receiver must be transmitted at least once before the message, thus requiring considerable bandwidth to enable receipt of public safety and information broadcasts which are to be sent to a large group of users. Unique message identification requires transmission of multiple copies of the same information, each copy possessing a unique ID or addressing code for decoding by one user. Frequency multiplexing requires modulation and broadcast of information on multiple channel frequencies, which is useful for distinguishing relatively large groups but cannot be applied practically to distinguish users down to useful differences in location, even assuming that local multiplexing and frequency conversion equipment is provided to accomplish the encoding. Encryption also requires either broadcasting multiple copies of the same information encrypted with the various keys possessed by the receivers, or addressed broadcasting of new encryption keys to individual users every time a different subset of users is to be selected. Moreover, known location distinctions are limited to the location of the receiver and are inapplicable to arbitrary ranges of proximity, selection via a plurality of geographic locations and/or areas of interest, and the like, which would enable generally broadcast information to be filtered for geographically pertinent information.

It is known to attempt to activate receivers in the event of an emergency broadcast (e.g., U.S. Pat. No. 3,993.955—Belcher). However, such systems provide no selectivity based upon the location of the receiver, which is activated in a general broadcast mode. It is also known to attempt to limit processing of information to particular subscribers having a certain zip code or state code (e.g., U.S. Pat. No. 5,070, 404—Bullock et al.) However, these invariable geographic definitions lack the versatility of arbitrarily defined areas, and the specificity of more localized location identifications that could render an information distribution system useful for local commercial offers and the like.

Providing for selective broadcast using any of the methods of frequency multiplexing, encryption, message identification and the like requires that the broadcaster maintain a catalog of all relevant receiver frequencies, encryption codes, or unique IDs. This catalog is limited to the location of the receiver. An inaccurate catalog can result in customer dissatisfaction with respect to general services at a minimum. When public safety information is broadcast, omission of customers can result in personal injury, property loss, or even fatalities. In addition to social responsibility issues, the broadcaster who attempts to define a subset of specific users at risk may provide a false sense of security. On the other hand, a set-top unit that can determine its own location (by a variety of methods) or can respond to a designation of arbitrary locations, immediately and accurately receives the geographically targeted information which the user requires.

According to the present invention, a processor is coupled between a receiver operable to display, record, or play back information and monitors digital information encoding location identifiers in a general broadcast signal. This arrangement allows the generally broadcast information to be filtered for locations in a variety of ways, and these ways preferably are embodied in applications routines to which users have access. There is currently no system capable of selectively providing user services based on user definable geographic locations in the manner discussed herein.

SUMMARY OF THE INVENTION

It is an object of the invention to enable identification of receivers to selectively process generally broadcast data or programming, by means of encoding arbitrary position information respecting one or both of the content of the generally broadcast information and the area of interest of a user of the receiver. In this context, a "receiver" is construed to include a variety of tuner-equipped devices such as television receivers, VCRs, cable interface boxes and the like, whereby a signal is selected.

Traditional broadcast of digital information has taken two approaches: either direct addressing of a particular recipient or a "universal broadcast" to all recipients. Traditionally these are intermixed, where some information is directed and some universally available. When the directed approach is used, and a large amount of identical information must be sent to some, but not all, recipients, the amount of information broadcast is proportional to the number of recipients. In a "universal broadcast", information cannot be restricted from certain recipients, and all recipients must respond to each of the broadcast digital packets to determine if the material contained therein is of interest.

This invention embodies a technique of controlling or filtering information based on the geographic location of the recipient.

According to a preferred embodiment, a set-top receiver such as a cable interface device or the like includes a processor, or at least a comparator, which is encoded at least with its own geographic location, e.g., via latitude, longitude, and preferably altitude. The receiver is coupled to an input means enabling the location to be changed. This information can be rendered accurate to a few meters. The position of the receiver, and presumably of the user thereof, is used by the associated digital information processor to determine the relevance of generally broadcast information which it receives. This information preferably includes digital information and may include, for example, offers of commercial services that are location specific, public, or legal notices targeted to a specific area, public safety and emergency information notices, and many other forms of information which the end user may wish to examine. Similar information which applies to locations in which the user is not interested can be ignored by the processor.

To a large extent, position information is applied to a certain area by encoding and/or calculating x and y borderlines in one or more polygons defining an area of interest. According to the invention, normal spatial coordinates such as latitude and longitude are preferably extended to include altitude. This is of particular interest for concerns such as emergency weather information because flood warnings, icing conditions and rain/snow boundaries are often related to altitude. For example, a flood warning may be of grave importance to a user at a low elevation adjacent to a river or other watercourse, but may be of less importance to someone whose latitude/longitude coordinates are even closer to the watercourse, but whose elevation precludes any danger under the circumstances.

The geographic position and altitude of the area (or volume) of interest can be defined more or less specifically, depending on the information which is being sifted by the data processor. For many types of messages, a general area designation may suffice. Preferably, however, the geographic definition can be made quite specific, which renders the invention useful for information which may apply for a limited area such as a neighborhood, a city block, or even a particular residence. Furthermore, the user is not limited to an area of interest definition which includes the location of the receiver, and additionally can select information at a range of distances from the receiver, at a location remote from the receiver, along a route between arbitrary points, and the like.

The invention overcomes problems with known receiver selection or access controlling systems to enable a wide variety of uses of broadcast information which is most usefully interpreted by its geographical relevance to the subscriber. It is possible according to the invention to selectively target geographical areas with messages relevant to that area without requiring complex time or frequency multiplexing. The end users have control of the geographic definition and can arrange to see, store, or otherwise process only messages relevant to selected geographic areas without having to process messages which are outside their area of interest. Alternatively, the user can choose to process all the messages. The processor can be arranged to control the receiver, to monitor general broadcast information in the background, and the to activate the receiver, switch channels, store information, generate an alarm, or otherwise to alert the user to messages of interest which may appear in the generally broadcast information.

It is an object of the invention to transmit considerable information with a minimum usage of broadcast bandwidth because additional bandwidth is not required to separate messages geographically or to address specific users, for example by unique or semi-unique encoding (e.g., political jurisdiction or subdivision, address, telephone number, zip code, receiver serial number) which must be cross referenced to stored data to determine longitude, latitude and/or altitude information. Nevertheless, such definitions of areas can be included, preferably as alternatives for designating an area of interest.

It is possible to transmit considerable information without use of secondary multiplexing equipment (for example as in U.S. Pat. No. 4,450,477—Lovett) to keep the information separated. A plurality of geographic areas of interest, each being arbitrarily selected by the user, can be designated. The user of the receiver, rather than only the broadcaster, has the ability to define which geographic area or areas are of interest to the user.

Inasmuch as geographic information is the basis of selection, broadcasts which are usefully interpreted by geographic location of the receiver need only be broadcast with their geographic information attached, rather than having to broadcast separately by unique ID or entitlement code to individual receivers known to be located in a given area, or to have to broadcast the same information on a plurality of frequencies simultaneously, or to have to broadcast uniformly to all receivers in a general broadcast.

The set-top unit of the invention can preferably monitor multiple locations for broadcasts, enabling subscribers to monitor information not only for their home, but a plurality of alternate locations, including such locations as their workplace, locations of other family members (for example, to monitor emergency weather information for an elderly family member), routes to be traversed, or simply to monitor breaking news. The set-top unit preferably supports multiple regions simultaneously, or a single location, and can respond to different input messages with different priorities as a function of user selections.

Transmission of information to a set-top unit can be by any broadcast method. Presently available methods include, for example, cable, radio broadcast, fiber-optic or other information transmission channels, digital and analog signals, or hybrids of both, private carriers and common carriers, and other broadcast methods. The invention is applicable to US television standards (e.g., NTSC), European or other national or international television standards (e.g., PAL or SECAM), emerging television standards including high-definition TV (HDTV) and digital TV, information media which are not directly coupled to television standards such as computer information networks and displays, and to non-visual transmissions such as audio-only channels.

Encoded programming as well as accompanying digital information can be broadcast wholly or partly on dedicated digital channels, transmitted during the vertical blanking interval of a composite video signal as currently used for TeleText or closed captioning, or otherwise encoded on a subcarrier of a video or audio channel or on another channel operating simultaneously.

According to a preferred arrangement, the geographic filtering of digital data is accomplished by data transmitted over ordinary cable television distribution lines, using the existing cable industry infrastructure.

At least the following classes of services are facilitated using the location identification features of the invention, and additional classes of information should be apparent from this exemplary list:

Public safety services such as hazardous weather alerts, hazardous condition alerts (e.g., chemical spills), and crisis information distribution.

Public information services, such as employment services, consumer information services, legislative information services, traffic and transit information services, and health information services.

Commercial information services, such as classified advertising, product information, and targeted marketing services.

Personal information services, including "want ads" (as exemplified by "situations wanted", "services available", "services needed", "wants-to-sell", "wants-to-buy", "missing pets", and similar uses).

Geographic-specific information services, such as neighborhood concern groups, regional political groups, etc.

According to the invention, information which is broadcast contains location information. This location information is used to filter out messages whose relevance is determined, at the option of the end user, to be of no interest. Alternatively or in addition, the information can be prioritized based upon distance, and displayed, stored or otherwise processed preferentially as a function of priority. One or both of the user and the broadcaster specifies one or more geographic regions by defining polygons and/or points. A data processor associated with the set-top unit can define polygons around a point, distances from points and the like to automate the geographic definitions and priorities. The intersection of polygons or polygons and points, as determined by the data processor, determines whether particular information is selected or ignored. This allows the user to make decisions based upon considerations of proximity, and appropriately and usefully to select information from a generally broadcast program or data stream. This information normally includes a great deal of information which is of no interest to the user, interspersed with information which is of interest, and by use of the data processor and the encoding procedure discussed herein, useful and desired data is readily and automatically separated from the chaff.

The invention provides a programmable receiver system to use location information embedded in a general broadcast or transmitted in connection with a general broadcast. By encoding and comparing locations and regions of interest, i.e., including not only points of interest but also linear routes, plural points and regions surrounding the points, the processor filters the received information to provide the end user with only the information of interest based on the user's selection of geographic constraints.

BRIEF DESCRIPTION OF THE DRAWINGS

There are shown in the drawings certain exemplary embodiments of the invention as presently preferred. It should be understood that these embodiments are examples only, and are subject to variations in accordance with the scope of the invention defined by the appended claims. In the drawings.

DETAILED DESCRIPTION OF THE PREFERRED EMBODIMENTS

Figure 1:
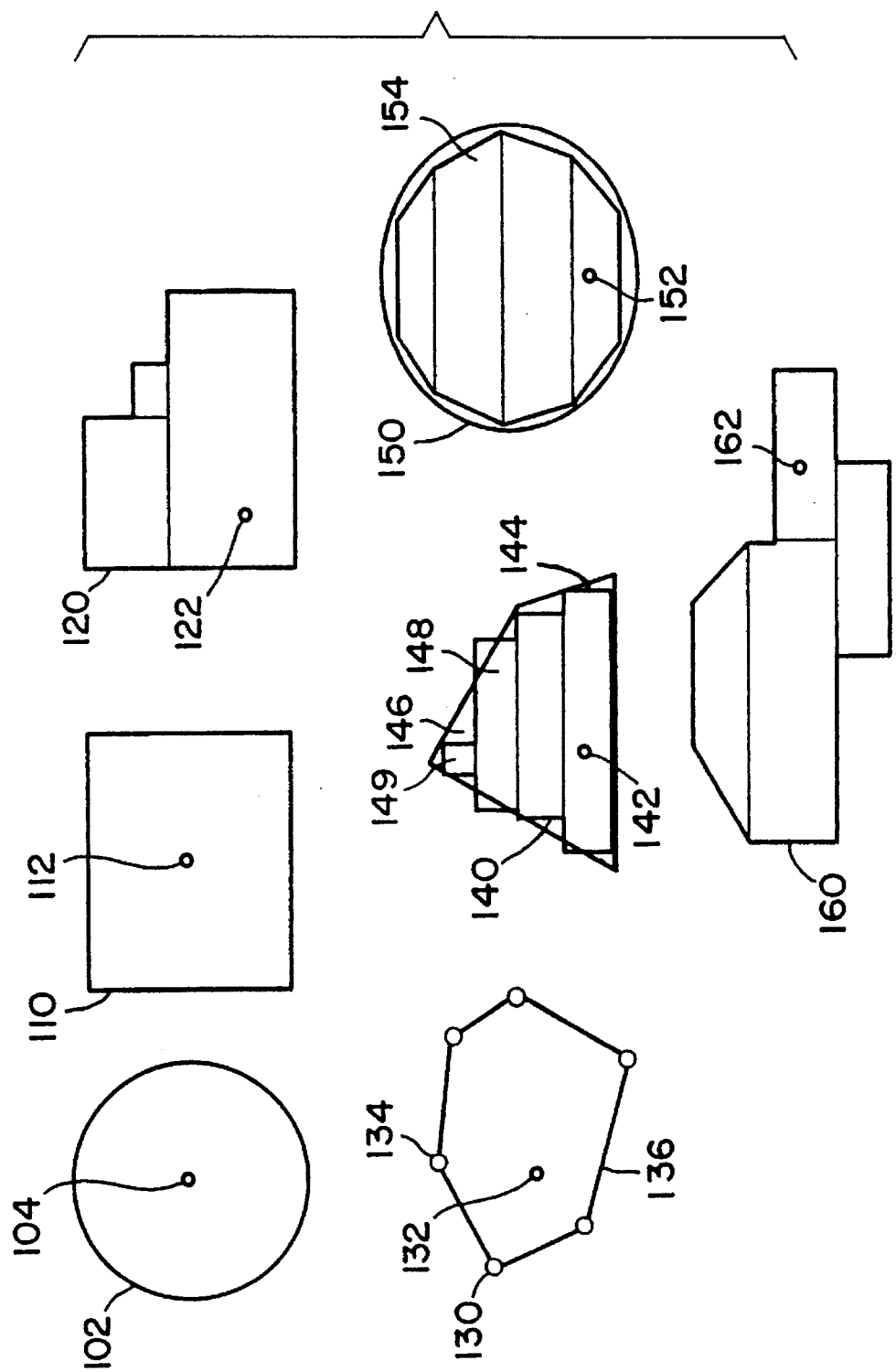
FIG. 1 is a graphic illustration showing a variety of techniques in which an area of interest is defined according to the invention, surrounding one or more designated geographic points.

Any means of transmitting data along a channel may constitute an acceptable delivery mechanism for information. This includes, for example, fiber optic cable, telephony or other point-to-point transmission, coaxial, twisted-pair, or other cabling point-to-point or broadcast, microwave, UHF, or direct satellite reception. The data transmission can be directed to all subscribers on a network or to a subnetwork or subset of the subscribers. Existing LAN and WAN transmission, including concepts such as using unused network capacity to broadcast such data in the background over any existing network, also apply. While all of these are applicable to the invention, a particularly advantageous application is by use of existing cable TV and so-called "wireless cable" TV. These systems are in place, provide multi-channel distribution capability, and sufficient bandwidth to transmit a great deal of information in video, audio, and digital forms.

According to a currently preferred method, geographic information is encoded to define a geometric property which may have two or more dimensions, generally designated herein as a "region". At a minimum, the region has no extension in any dimension, being a single point. This point designation can be employed to designate, for example, the location of a service or goods provider in a commercial ("classified ad") broadcast. Other regions may be represented by a simple closed geometric shape (such as a point and a radius to define a circular region, e.g., a region in which a merchant may provide free delivery service), or an arbitrary region comprised of the union of a set of shapes, such as rectangles, circle segments, trapezoids, or other polygons, or combinations such as chords or segments thereof. A pertinent single point, area, volume or the like is referred to herein as a "location of interest." A typical location of interest can include or be the set-top unit location, but also could be any other location chosen by the user. For simplification, a particular "location of interest" is discussed herein as an example of a location definition chosen by a user or employed in a broadcast. However, the "location of interest" should be construed to also include a two-dimensional or higher-dimensional "region of interest."

At least some location and/or region information is encoded both by the transmitter of information and by the receiver itself. The transmitted geographic information can be provided in a header preceding a data packet or other unit of transmission, in a catalog of transmission units to follow, in information on a second channel transmitted at substantially the same time as the information to which it refers or at another location, time or representation, or provided encoded in some other transmission whereby the location information can be referenced to the transmission unit(s) to which it applies.

The locations of interest employed either for the transmission unit or for the set-top unit can be points, areas, volumes or the like. When the geographic information of the message, for example, is a single point or a small region, its relevance is determined by whether or not its geometric intersection with designated regions of interest of the receiver is a non-empty region. When the geographic information of the message is a large region (such as a section of a city), its relevance may be determined by whether or not the point representing the set-top unit's location of interest is contained in the region. Preferably, both techniques are made available, such that the transmitting party and the user can alternatively define points and areas by grid positions or by an applicable artificial coding such as postal code (e.g., zip code), political jurisdiction (e.g., city, county, state), telephone exchange, street, block, subdivision or similar informal geographic indicator, or the like. Typically, artificial coding consumes fewer bits than a precise geographical definition, and may be useful for convenience. These alternatives can be cross referenced in the set-top data processor or in the transmission, such that the artificial encoding is convertible into a polygon or set of polygons which will be tested for intersection with the location information contained in the other of the data processor and the transmission.

When a message has a non-empty intersection with a region of interest, the message is said to be "of interest". One can refer to the set-top unit as "noticing" the messages of interest if it chooses to react to them or "ignoring" messages which are not of interest. Messages which are not of interest preferably are not processed beyond the extent required to determine their interest, although it is also possible that such messages could be processed differently than those of interest, rather than being wholly ignored, for example being stored but not acted upon.

FIG. 1 illustrates a two dimensional coordinate system based on latitude and longitude. A three dimensional or multi-dimensional application of these techniques is also possible. e.g., using altitude as a further limiter, in which case the region is actually a volume. In FIG. 1, the circle 102 is the locus of points equidistant from a point in two of the dimensions, for example the location of interest 104 in an X-Y coordinate system. An alternative representation of a region of interest is the rectangle 110, where the location of interest is in the geometric center of the rectangle at 112.

The foregoing suggests that a "point" is dimensionless, i.e., the intersection of precisely defined mutually perpendicular lines. A less specific representation of a point or region can be used. e.g., by defining a set of squares or rectangles wherein the minimum unit is considered to be a point even though it actually encompasses a discrete area. The additional generalization is that the locus or precise point can be anywhere in the closed polygon, such as in polygon 120, containing the precise location of interest 122.

A region such as region 130 may be defined by a set of points surrounding the location of interest 132, where the points, one of which is shown as point 134, define a set of edges, one of which is shown as 136.

Non-rectangular regions may also be approximated by rectangles, such as region 140, which surrounds the location of interest 142. Rectangles 148 and 149 illustrate two mechanisms of approximation. In the drawings, rectangle 149 is fully enclosed by the region 140 to be approximated, and rectangle 148 is not. Depending upon whether the user (or transmitter) wishes to err by omission of marginal edges or by inclusion of excess area around the region 140, either method can be used.

It should be noted that a closed polygon is not strictly required to designate an area. It is also possible to define an area as being anywhere to one side of a line or to selected sides to two lines. etc. For example, marine and land-relevant information could be distinguished by defining a line corresponding to the coast, and determining on which side of the line a point or region falls.

Preferably, the system is capable of distinguishing locations to a degree which is useful in connection with the information being transmitted, and the specificity of this information can be variable. For locally active commercial business messages, a minimum unit may be as small as a block or even as small as a residence. By encoding longitude and latitude to a tenth of a degree of arc (which is a resolution used by global positioning satellites (GPS), long range radio navigation (LORAN) and the like), it is possible to encode a point anywhere in the world using as few as 48 bits, to a resolution of ten feet by ten feet (at the equator).

It is useful to include the ability to encode irregular geometric shapes. The use of trapezoidal subregions for this purpose reduces the error without increasing the number of subregions required to define a region. The circular region designated 150 which surrounds the set-top unit's location of interest 152 can be closely approximated with a small number of trapezoids, exemplified by the trapezoid designated 154.

Trapezoidal subregions allow complex shapes to be approximated with a smaller degree of error while minimizing the number of actual subregions required. The circle designated 150 in FIG. 1 enclosing the location 152 is very closely approximated by a small number of trapezoidal regions such as that designated 154.

This method for defining areas, locations, and/or multidimensional volumes is not limited to convex polygons. Referring again to FIG. 1, polygonal region 160 surrounding location 162 consists of several subregions, which in this example includes both rectangular and trapezoidal subregions.

Figure 2:
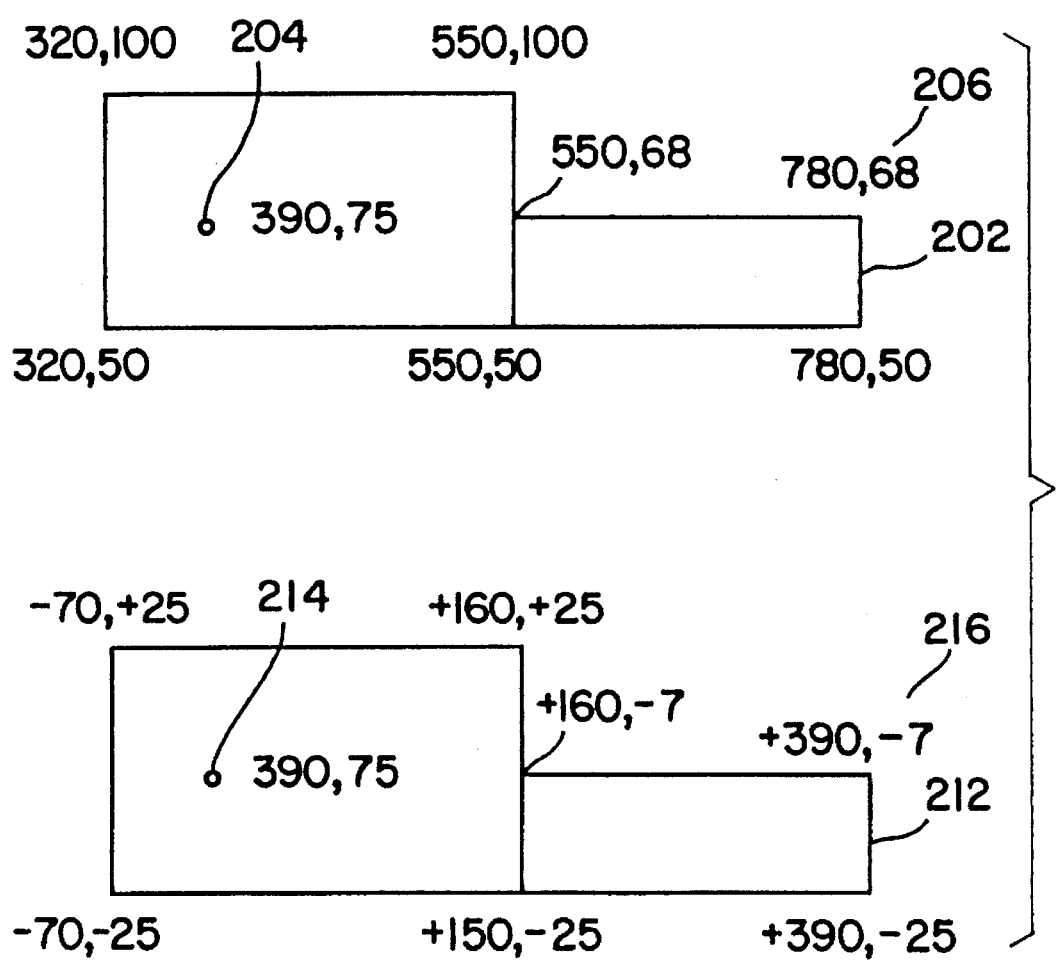
FIG. 2 is a graphic illustration of an alternative embodiment relying on absolute and relative coordinates.

FIG. 2 illustrates the application of absolute and relative coordinates. Preferably, the processor associated with the set-top unit includes the ability to convert between absolute and relative positions in determining the intersection or non-intersection of defined points and/or regions. Region 202 contains an absolutely defined location 204 having an X coordinate and a Y coordinate. For example, the coordinates 206 of a point, as exemplified by coordinate 206, are in absolute coordinates of latitude and longitude. For simplicity of illustration, additional dimensions, e.g., altitude, are omitted from the example shown in FIG. 2.

An absolute coordinate system other than longitude and latitude is also possible, particularly in a regional data transmission network wherein all the users are located within a defined area. The coordinates in FIG. 2 are arbitrary integers for the purpose of illustration. Region 212 is identical to region 202. The location of interest 214 in the region, identified by absolute coordinates, is used to define relative coordinates of the apices of the polygons defining the region of interest. The coordinates relative to the location of interest, which is arbitrarily assigned 0,0, can be convened readily into absolute coordinates using the absolute coordinates of the point of reference, in this case the location of interest of the set-top unit, 214. However, for purposes of convenience such as in defining a location of interest within a certain distance (e.g., walking distance, where the definition of walking distance might be variable, such as for a marathon runner vs. a person suffering from arthritis) from the location of interest, can be processed as relative coordinates such as illustrated by the coordinate 216 and converted back and forth between relative coordinates 216 and absolute coordinates 206. Similarly one coordinate system can be convened into another using simple calculations of this type.

The data processor associated with the set-top unit receives location information from the transmission and from the user, or perhaps from an application routine which the user employs to define locations of interest, e.g. , in response to selections made in a menu or the like presented to the user as a pan of the process. Having defined regions and/or points, the data processor compares them in the same coordinate systems in order to determine whether the transmission location data and the selection location data intersect.

Figure 3:
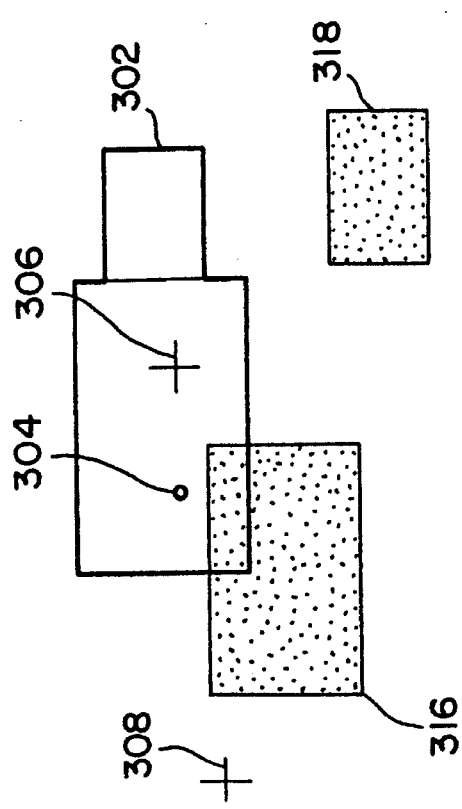
FIG. 3 is an illustration of containment tests undertaken by the processor according to the invention for determining the intersection or non-intersection of points and/or regions.

FIG. 3 illustrates containment tests for this purpose. Region 302 includes the set-top unit location of interest 304. For simplicity of illustration, the third or further dimensions, such as altitude, again are not illustrated. A message may encode a point, such as points 306 or 308, or a region, such as rectangular regions 316 or 318. By a suitable comparison of the polygonal edges of the defined regions using a series of less-than, greater-than comparisons, the data processor can determine an intersection or lack thereof.

Figure 4:
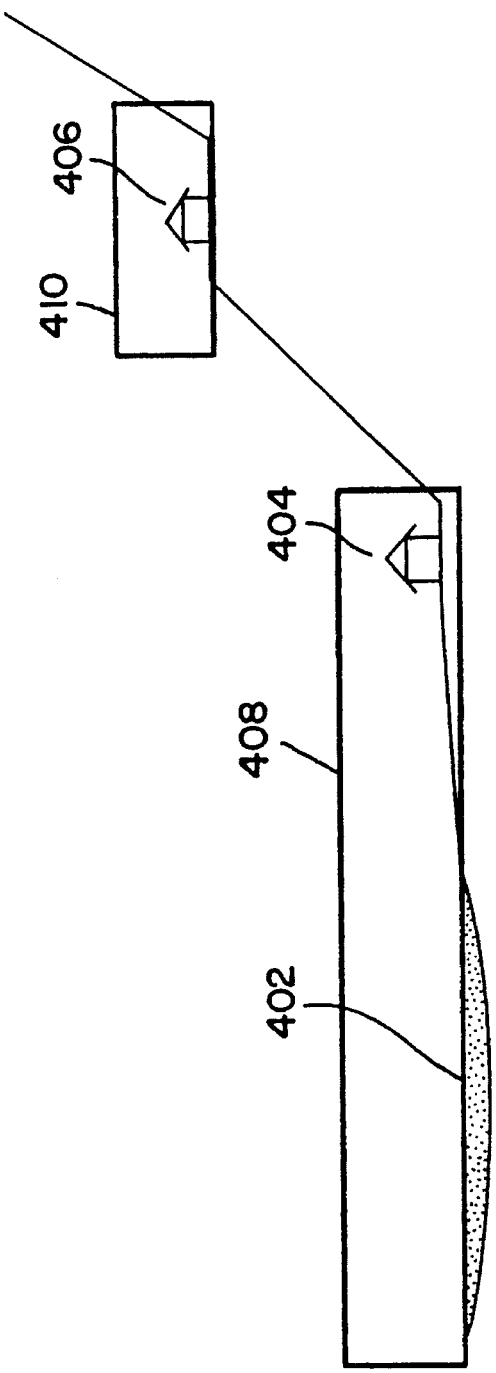
FIG. 4 is a graphic illustration of an alternative embodiment comprising more than two dimensions, in particular illustrating altitude as a further dimension used to define intersecting points and/or volumes.

FIG. 4 illustrates application of the invention to regions including three dimensions. The use of altitude information, for example, is useful to distinguish between locations which may have different exposure to an altitude related environmental parameter. The particular example is for flood warning messages. The river 402 occupies a lowermost location, and depending upon flooding conditions may occupy a variable X-Y area, depending upon the flood stage. Two residences at locations 404 and 406 are quite close in X-Y position but have differing elevations. In the side elevation view of FIG. 4, regions 408 and 410 are illustrated by rectangles 408 and 410, which represent a horizontal extension of latitude and/or longitude, and a vertical extension of altitude or elevation. It would also be possible in this situation to use a vertical point (rather than an extension), namely the lowest elevation of the residence at location 404 or 406, to define the vertical point, any information respecting a lower elevation being of interest to the user in connection with a flood warning. If access to location 406 would be affected by a flood, the region of interest for the residence 406 would include additional, regions, possibly disjoint from the region 410, which would encompass the portion of the access to location 406 that would be adversely affected by a flood.

A simple region 102 as shown in FIG. 1 and defined by points within a particular radius of a defined point such as the location of interest, is also readily employed by the data processor to compare transmitted and user-selected location information. A typical use of a region such as this would be to locate a set of service providers within a given distance of the receiver (for example, locating all the ice-cream shops within walking distance). In that case, the service providers define their point locations in connection with a transmission which the data processor compares to the user-defined circular region to determine intersection.

The same considerations operate in the opposite direction. For example, a service provider may define a service zone, which the data processor matches with the user's selected location of interest (e.g., that of the set-top unit) to determine intersection (for example selecting drywall suppliers who deliver free within a zone including the user's remote construction site at Broad and Main Streets).

The region 110 in FIG. 1 is defined by mutually perpendicular borders at equal distances from the set-top location of interest 112. This form of location identification is useful, for example, to define nearby locations based on city blocks (assuming the blocks are in a rectangular grid). Its applicability is the same as region 102.

The location of interest need not be centered in the region of interest, as illustrated by region 120 in FIG. 1. The location 122 can be an any arbitrary location within the region, and preferably the user can define a region based on other needs than the need to locate information respecting locations near his or her receiver. An asymmetrical relationship between the receiver location and the borders of the region of interest is appropriate, for example, to define a political area, such as a designated neighborhood. An example of a use of this son of region might be a pizza delivery service which delivers within a particular neighborhood, or the like. The general broadcast information may include a listing or advertisement for any or all the pizza shops within the information distribution area. Instead of wading through listings to find those pizza shops which will deliver to a location, perhaps necessitating querying each shop individually, the user can simply define the location, instruct the data processor to limit information not only by location but also by text (e.g., the string "pizza" and/or "deliver"), and the data processor can sift through the available information for a match. Only those set-top units in the respective delivery areas are "interested" in messages from shops that serve them. Thus if region 120 represents a pizza delivery area and the location of interest is 122, it will "notice" the message about the service.

Selection of information to the specifications of the user can be an interactive process, using repetitively transmitted commercial messages which the data processor monitors upon command for selected locations and descriptive information. Alternatively, the processor can include a memory whereby location information triggers storage of information in a database which is updated when new information is received. This database can be searched "off line", at the user's convenience. In that case, the location designated information of interest is not necessarily displayed, but is processed differently than information which is not of interest, which is normally ignored entirely. In addition to selective processing of data in this manner, the data processor can be alert for information tending to prioritize the information. For example, a severe weather warning can be indicated by an appropriate code or text string, and the data processor can be programmed to generate an alarm, break into programming otherwise being displayed or otherwise to provide an appropriate warning to the user based on the priority of the information received.

A region may also be designated by a set of points, such as region 130 in FIG. 1 surrounding location 132, located arbitrarily within the region. A set of points, such as points 134, are connected by edges such as 136, to define the region. In processing this information to determine intersection with another region or point, the processor defines one or more lines intersecting the points and determines whether the point or region lies on one side of the line or the other. Thus the borders of the region can be defined by points, lines, distances from points or lines and by any other arbitrary selected designation of a subset of all the area within the potential universe of interest.

Non-rectangular regions may be approximated in a variety of ways. Region 140 in FIG. 1 contains the location of interest 142. Each of the rectangles (e.g., 144) provides an approximation of the outline of a region containing the location of interest. Area 146 is within the irregular contours of the area being approximated, but in fact is omitted from the defined region. The degree of error decreases as the number of rectangles increase. Where the region can be defined by any number of rectangles or other polygons, and there is no constraint that all rectangles be of identical height, which is a generalization of traditional mathematical methods of approximation, the region can be defined in usefully specific detail. Defining a region by rectangles and polygons has the advantage that membership tests are simple, but the bits required to define the area increase with the complexity of the polygon and the desire to minimize the error of the approximation.

It is possible to choose a technique of approximation to ensure either that all the area of interest is included in the defined region (including some erroneous excess), or to ensure that none of the defined region exceeds the area of interest (thus erroneously omitting some of the area of interest). Alternatively, this choice can be made in an alternating manner to provide a general approximation. Whether to use one technique or the other depends on the nature of the message. The rectangle 148 in FIG. 1 encompasses a small area outside the intended region but includes additional space. The alternative technique is embodied in rectangle 149.

Trapezoidal subregions allow complex shapes to be approximated with a smaller degree of error while minimizing the number of actual subregions required. Circle 150 in FIG. 1, enclosing the location 152, is very closely approximated by a small number of trapezoidal regions such as that designated 154. The defined region is made larger or smaller than the actual region by making the trapezoidal edges tangents to the circle or chords, respectively.

The method is not limited to convex polygons or to any particular subregion technique. Region 160 in FIG. 1, containing the location of interest 162, consists of several rectangular blocks and a trapezoidal region.

The endpoints or dimensions of such regions or their composite subregions are preferably specified in geographic coordinates, either absolute coordinates or coordinates measured relative to the nominal location of interest. This is illustrated in FIG. 2. Region 202 contains the location of interest 204. The coordinates of the region, such as coordinate 206, are expressed in absolute geographic positions. For simplicity of illustration simple integers are shown. In a preferred embodiment, the coordinates are geographic latitude and longitude, and a third dimension is altitude above or below some designated reference value, e.g., nominal mean sea level. This would be used in typical applications to designate geographic areas such as specific neighborhoods, political regions (examples being city or county borders), topologically designated areas (examples being an area "near the river" or within a certain contour elevation line and consequently subject to flood warnings, "on the west side of the hill" and perhaps in danger of high winds). It is possible to store shorthand designations or tokens which represent a region having a complex shape, for references to regions which are of use for particular messages. Relative encodings encode designations such as "within five blocks of my location" or "within a mile of location X,Y", and so forth.

Altitude information can be readily encoded by use of a digital barometer. Normally, a barometer indicates only absolute pressure and cannot be used to determine altitude unless the barometric pressure correct to a known altitude, such as mean sea level, is also known. However, because of the nature of the broadcast information, a barometric correction or reference can be transmitted as pan of the information being processed, and thus the correction can be automatically applied to the absolute barometric pressure to derive an altitude.

The significance of altitude in creating a three-dimensional region is to direct information to specific locations which may be geographically proximate in latitude and longitude, but significantly separated vertically. The difference in elevation may have considerable relevance to the messages, such as vertical proximity to a river being relevant to flood alerts.

A message which is received includes its own region information or is transmitted in conjunction with a separate and cross-referenced signal representing the region information, for example on a digital channel of a cable distribution network dedicated to such information. Preferably, any information which has a non-empty intersection with the region of interest encoded in the receiver will be considered a message of interest, at least stored for reference by the user, and preferably displayed upon request. A message may encode a single point as its geographic information, or it may encode a region encoded as previously described. Standard geometric intersection algorithms can be used to test for containment or intersection.

The advantage of the use of regions is that messages, particularly safety and public information messages, can be directed to the receivers to which they apply. Examples of the usefulness of the information are readily apparent. For example, assuming that bus service will be re-routed in an area due to construction, a message containing this information can be encoded with a region which represents distances surrounding the area of disruption. Only those set-top receivers whose location of interest is within the area of concern will "notice" the message as relevant. In addition, another information message can be transmitted which includes the area surrounding the entire bus route, so that riders who may be using the bus will receive this notification. Those riders who use the bus may specify that they wish to see any public notification messages along their route of travel regarding transportation, by specifying the region of their bus route and/or by entering suitable input commands to cause the data processor to search not only by location but also by keyword.

A preferred embodiment of tests is illustrated in FIG. 3. Region 302 is the region surrounding the location of interest 304. A point transmitted in a message is considered of interest if it is within the region, such as point 306. A point is considered to be of no interest if it is outside the region, such as point 308.

The transmitted message includes a region designation. A message is considered to be "of interest" if the intersection of its region, with the chosen region is non-empty. In FIG. 3 this is illustrated by region of interest 302. A region which is defined in the transmitted message, such as region 316, is determined to be of interest because it intersects the region of interest 302. The region designated 318 is determined to not be of interest because it does not intersect the region of interest 302. In this illustration, for the sake of simplicity of illustration, only simple regions are shown and only in two of the possible dimensions of space, time and subject matter.

While it is preferred to transmit a full definition of the respective region with its corresponding message, for complex regions, particularly those designated broad areas such as political units (cities, counties, states, legislative districts, informal districts such as subdivisions or the like), it may be more effective to transmit the name, or a suitably encoded representative of the name, to the receiver. The mapping of the names of said designated broad areas, or their encoded representations, to the actual regions, can be broadcast separately and stored in the set-top unit. An example would be to transmit a county name and the region defining it, whereupon later messages intended for county residents transmit only the county name as a shorthand location designation. For this to be successful, repetitive transmission of the mapping and their shorthand codes are needed to guarantee that all set-top units contain the mapping.

Figure 5:
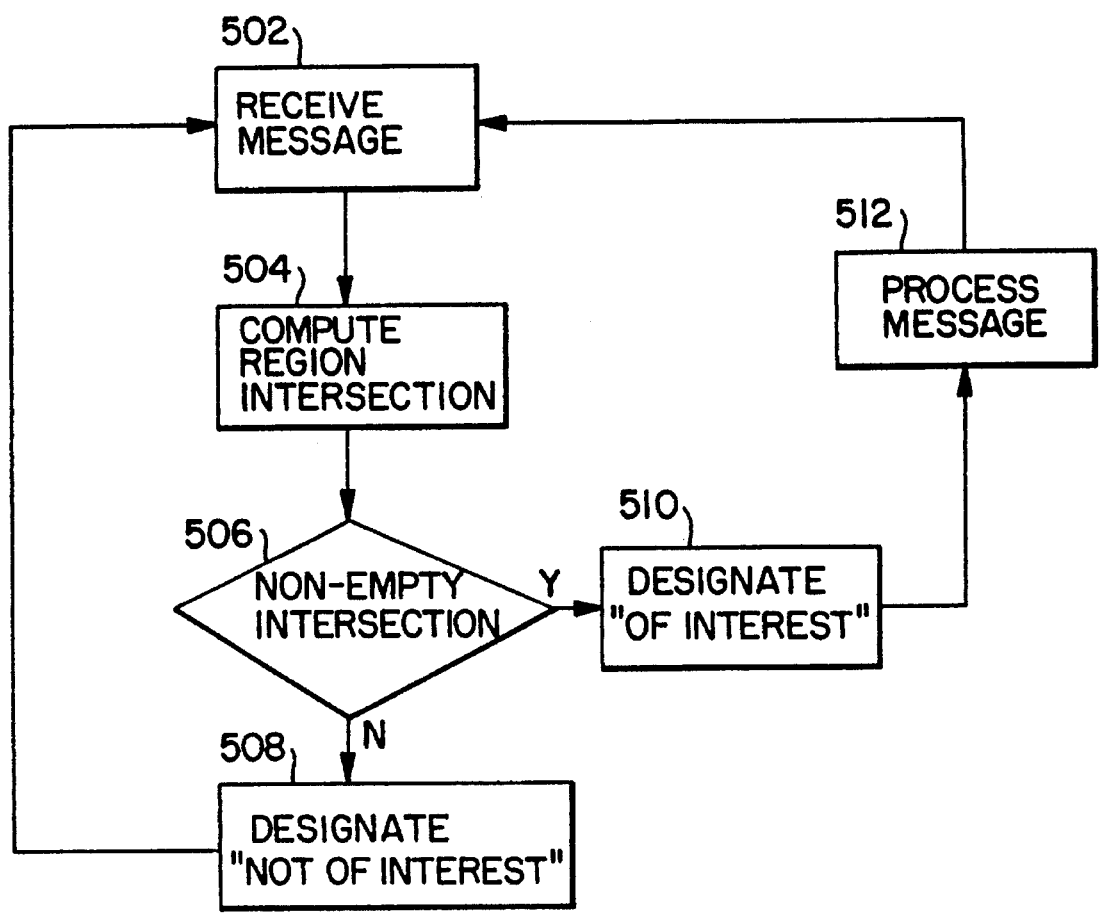
FIG. 5 is a flowchart illustration showing the processing of data according to the invention.

The flow of processing of messages by the data processor is illustrated in FIG. 5. A message is received at block 502 and includes a location designation. The processor has a stored location selection, which can default to a selection based on the location of the receiver, and which can include or be replaced by any arbitrary selection made from user input. The region intersection with the appropriate regions is computed at block 504. Block 506 represents an intersection test: is the intersection of the region of the message with the set-top unit's regions of interest non-empty? If the intersection is empty, control flows to block 508, which handles the processing of "non-interesting" messages, typically discarding them. From this point, control returns to the message receipt block 502. If the intersection is non-empty, control passes to block 510, in which the message is designated as "interesting". This will usually involve determining a processing routine to handle that message for storage, display, or both. Finally, the message is actually processed at block 512. This processing may encompass a plurality of actions, including, but not limited to displaying the message on a screen, either exclusively or as a message-over-video, performing any of a plurality of necessary controls to make the message visible, such as turning the receiver on and/or modifying the receiver's channel or volume settings to display the message, storing the message for later retrieval, directing the message to a plurality of externally connected devices, such as attached personal computers, activating visual, audible, or other alarms to notify those in proximity of the receiver (as would be appropriate, for example, in the event of a tornado alert or flash flood alert for the area).

Upon completion of the processing, control returns to receipt block 502. Although this figure, for simplicity, illustrates a single thread of control and processing for a single message, this is not a restriction. It is also possible to process the data using a multi-threaded control structure. Multi-threaded control may be in a single address space or a plurality of address spaces on the receiving processor. A wide range of possible transaction and event processing paradigms, common in ordinary practice, can also be applied to effect the necessary processing steps.

Figure 12:
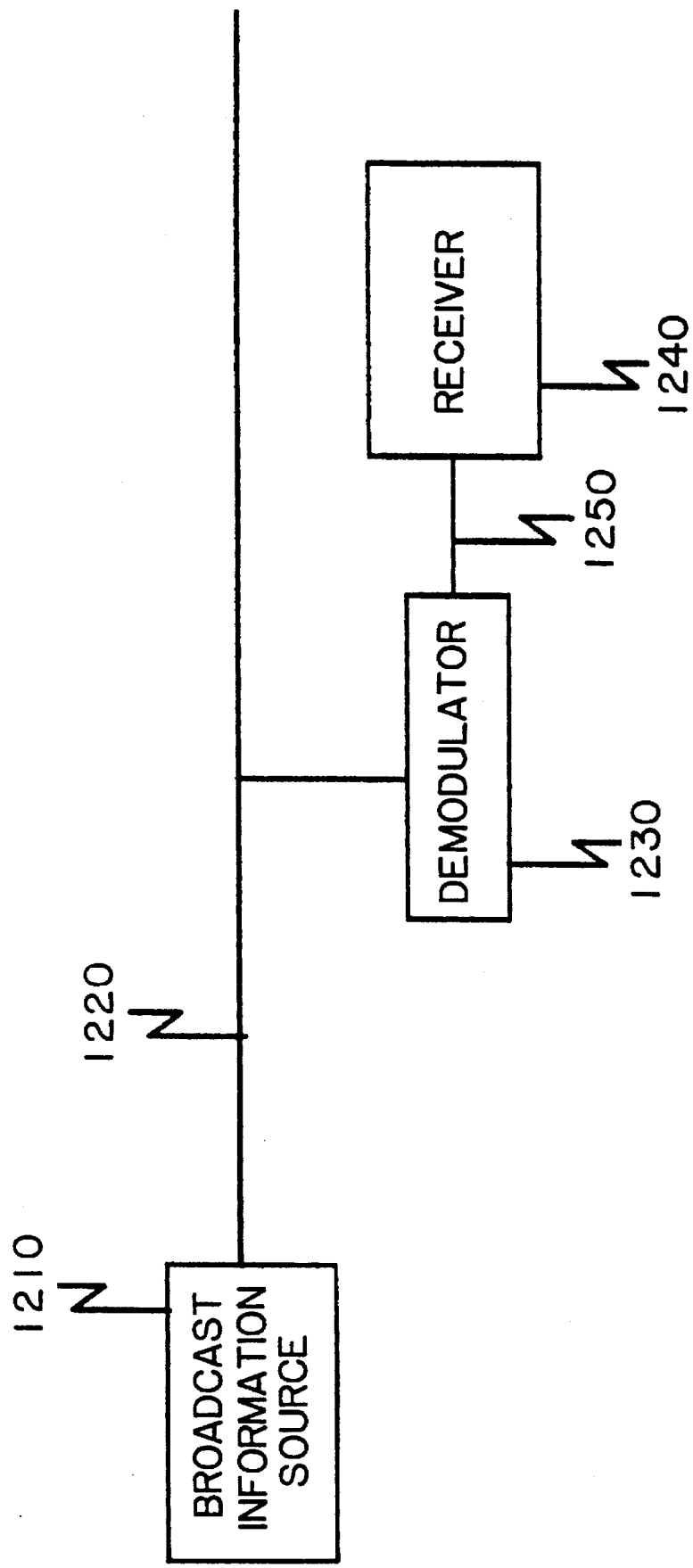
FIG. 12 is a graphic illustration of how the receiver and broadcast information source are connected.

FIG. 12 illustrates an embodiment which can be used to allow a conventional personal computer to be used in a manner as described in this invention. The Broadcast Information Source 1210 provides a digital information stream divided into packets of information in a manner similar to that used in many packet messaging systems. For example, the EtherNet protocols as defined by IEEE standards document 802.3 describe one such embodiment, as does the IBM Synchronous Data Link (SDLC) protocol and the X.25 protocol. The substantive difference between these existing protocols and the current invention is that the current invention does not use a destination address to determine whether or not the packet is to be processed, but instead uses a point or multi-dimensional geometric description of a geographic region of interest, from which the recipients determine whether or not the packet is of interest by comparison with their own defined regions of interest.

Figure 16:
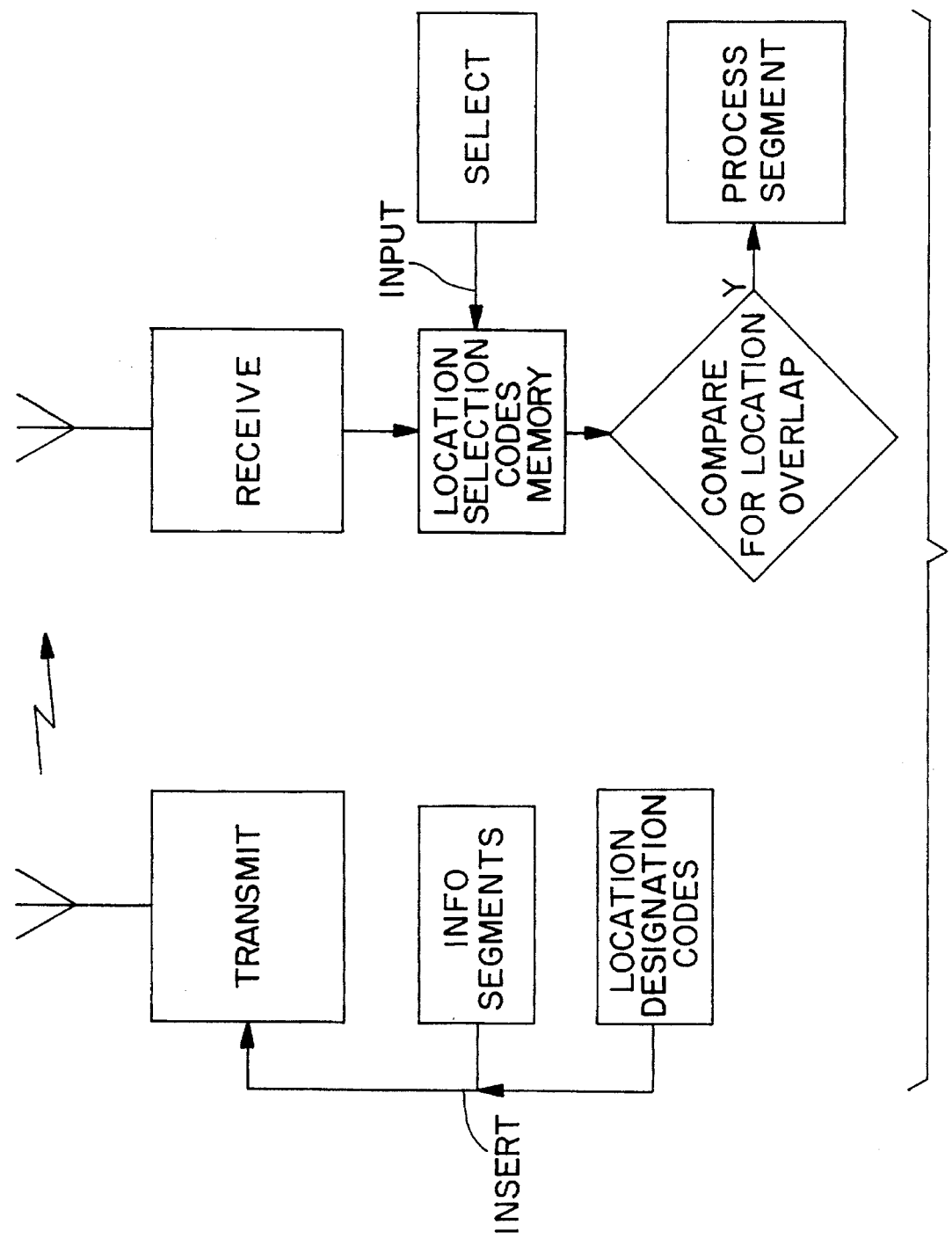
FIG. 16 is partly a block diagram and partly a flowchart representing an overview of the apparatus and method of the invention.

FIG. 16 generally illustrates the structural and functional elements of the invention, in a combination block diagram and flowchart form.

The digital information stream preferably is modulated onto a carrier and broadcast via a transmission medium. In one preferred embodiment the transmission medium is a conventional broadcast television cable distribution system illustrated as 1220, and the Broadcast Information Source comprises a conventional "head end" technology, as used in the cable broadcast industry. A demodulator 1230 is coupled to the broadcast system, and demodulates the digital information. An exemplary demodulator is the General Instruments DataCipher receiver apparatus. The result is a digital information stream, which is transmitted to the receiver 1240 via an appropriate interface. The demodulated signal coupling 1250 can be an RS-232C or equivalent serial data connection and the receiver 1240 can comprise a conventional personal computer. An example of a product having the appropriate demodulation and interface capability is the TeleCommunications Inc. (TCI) X*Press Data System interface unit.

Figure 15:
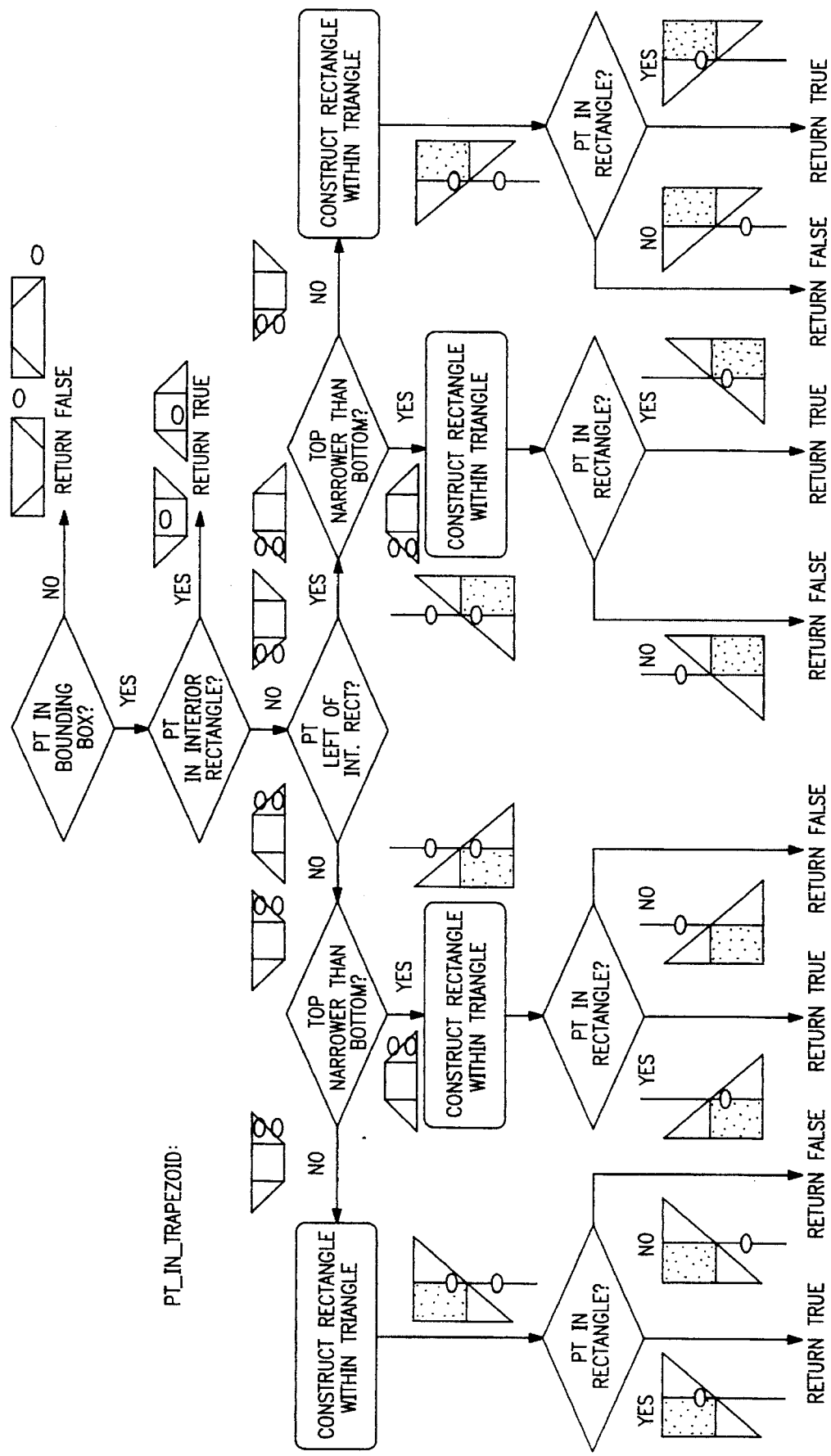
FIG. 15 illustrates the flowchart of the decision process dealing with determining point inclusion in a trapezoid, and each decision point is illustrated with the cases that it tests.

FIG. 15 illustrates a preferred embodiment of one pan of the procedure illustrated in FIG. 5, namely "Compute Region Intersection" 504. Three kinds of tests can be performed by procedure 504, depending on the manner in which the transmission and the receiver have defined a location of interest: (a) information defining a region can be transmitted to the receiver, and the receiver has information defining a point of interest and wishes to determine if the point of interest is contained in the region transmitted: (b) a point can be transmitted to the receiver, and the receiver has a region of interest and wishes to determine if the transmitted point is contained in the region of interest: or (c) a region can be transmitted, and the receiver has a region of interest and wishes to determine if the transmitted region overlaps the region of interest.

Figure 6:
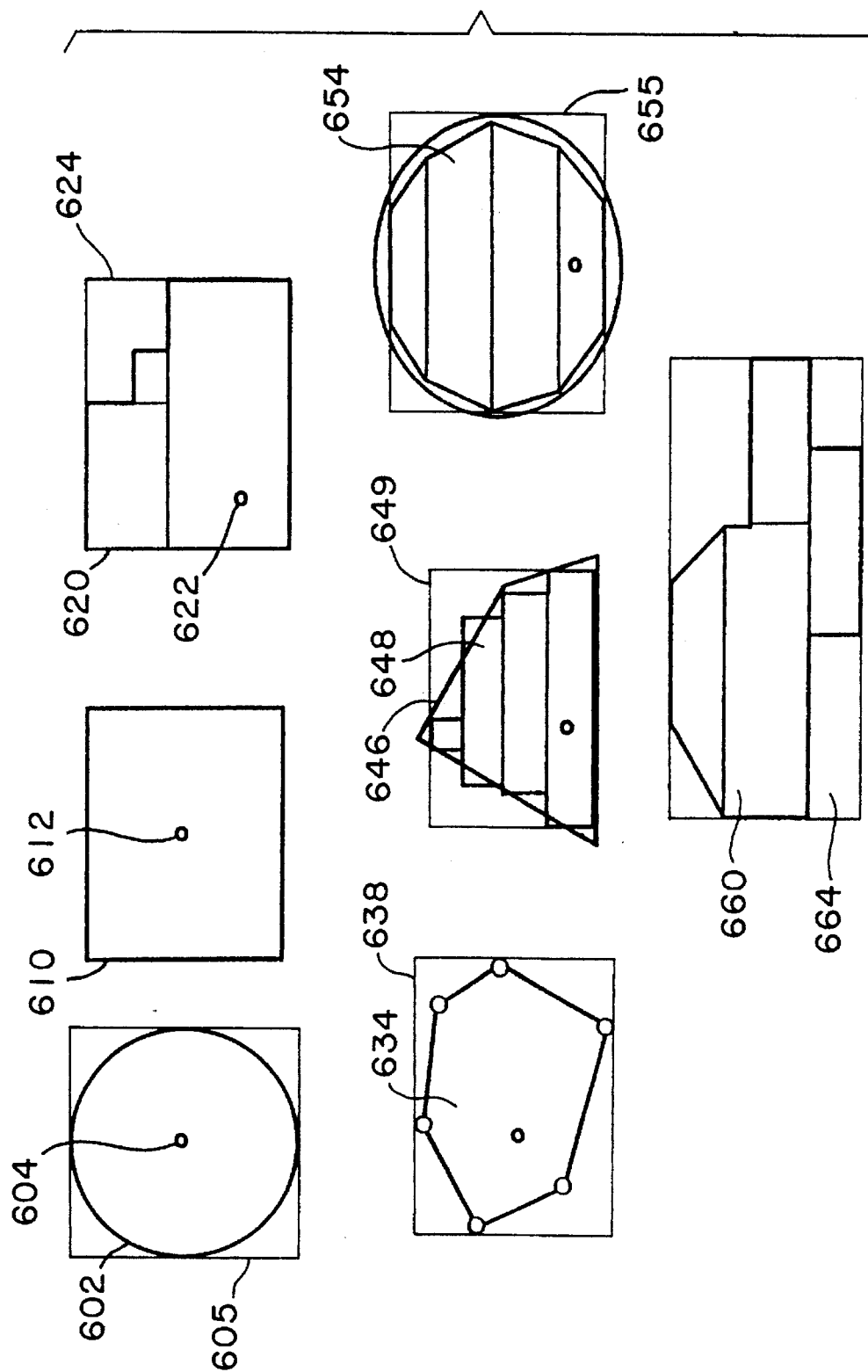
FIG. 6 is a graphic illustration showing bounding boxes surrounding the regions illustrated in FIG. 1.

The included process, to improve its efficiency, relies upon a concept called a "bounding box", which is illustrated in FIG. 6. FIG. 6 corresponds to FIG. 1 except for the addition of the bounding boxes.

A "bounding box" for a set of points is the smallest rectangle that encloses said set of points. A "bounding box" for a geometric figure is the smallest rectangle, aligned along some specific coordinate system, that encloses said figure. Referring to FIG. 6, the bounding box that encloses circle 602, which surrounds point 604, is rectangle 605. The bounding box for rectangle 610, which surrounds point 612, is exactly rectangle 610. The bounding box which encompasses the region described by rectangles 620 is rectangle 624. The bounding box which surrounds polygon 634 is rectangle 638. The bounding box which encloses the polygon approximated by rectangles 648 is rectangle 649. The bounding box which encloses the area approximated by trapezoids 654 is rectangle 655. The bounding box which encloses complex region 660 is rectangle 664.

While the use of a bounding box is not required, bounding boxes can substantially reduce the complexity of the step of determining if a point is enclosed in a region, or if two regions overlap.

Figure 7:
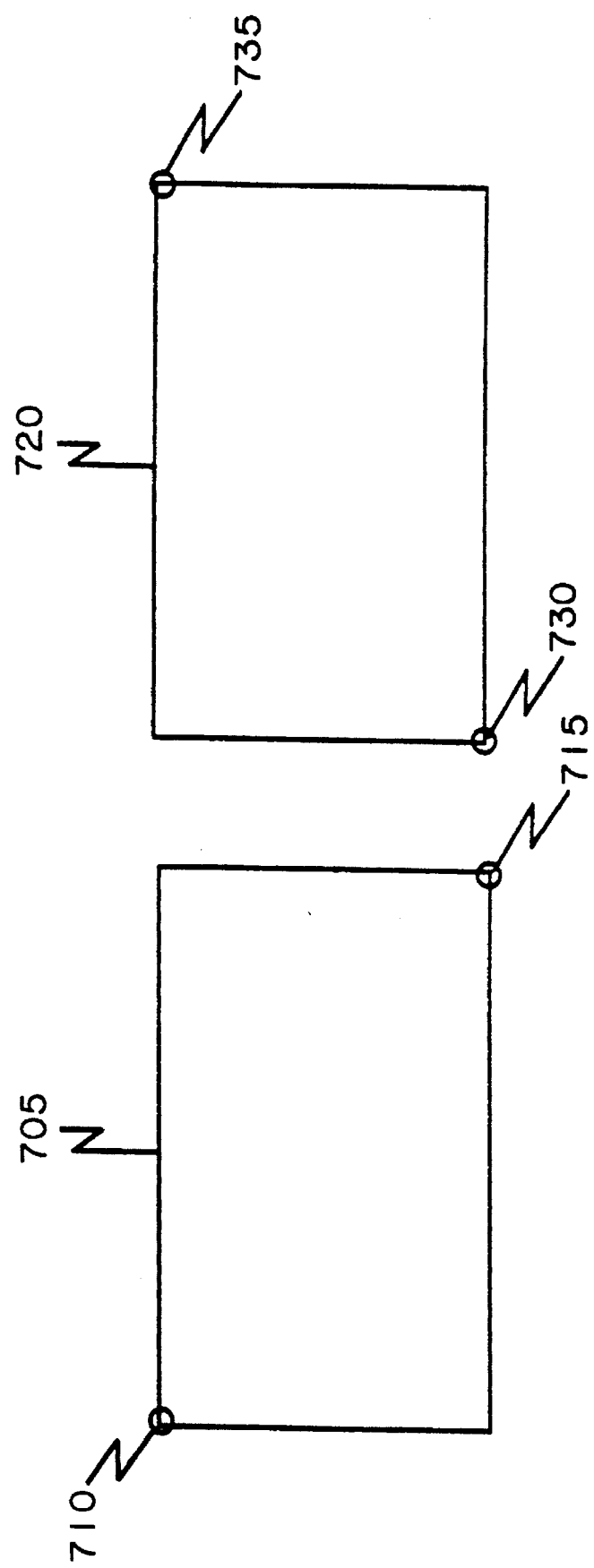
FIG. 7 is a graphic illustration showing two alternative encodings of a rectangular region or a bounding box.

A preferred embodiment of a bounding box representation is shown in FIG. 7. A bounding box 705 can be defined, for example, by the coordinates of opposite comers in a coordinate system, such as its upper left comer 710 and lower right comer 715. In another example, bounding box 720 is represented by the coordinates of its lower left comer 730 and upper right comer 735.

The coordinates of the points defining a point of interest, the coordinates of the points describing the geometry of a region of interest, or the coordinates describing the comers of a bounding box are expressed in terms of a base coordinate system. In a preferred embodiment the base coordinate system references a geographic coordinate system of latitude and longitude. Coordinate values in this base coordinate system can be represented by integers, for example to a resolution of 0.1 second of arc in latitude and longitude. When relative distances must be represented, for example the radius of a circle, these distances also can be expressed as integers representing 0.1 second of arc. In general, the use of degrees of arc to represent distances is subject to geometric distortion, i.e., a distance expressed as a longitudinal arc distance corresponds to different statute distances at different latitudes. In one embodiment of the invention the location of interest may be a particular position such as a fixed position of a receiver, and any one region of interest is encoded to a small enough local region that errors introduced by approximating statute distances as fractions of a degree of arc are small enough that they do not matter. In the remaining cases, region descriptions can be handled as a series of approximations, such as shown in FIG. 1, where region 140 is approximated by a sequence of rectangles 144 so as to reduce errors introduced by the approximation. Approximations as shown allow a local region to be treated as a flat projection of spherical coordinates, and potentially complex geometric computations or tests based on spherical geometry are reduced to simpler geometric tests based on a rectangular coordinate system and plane geometry.

In a preferred embodiment of a 3-dimensional representation, altitude likewise is represented by an integer distance above or below a datum plane, such as Mean Sea Level (MSL). Thus altitude can be expressed, for example, as meters above or below MSL, or feet above or below MSL, etc. Other datum planes can also be used as a reference datum plane.

Figure 8:
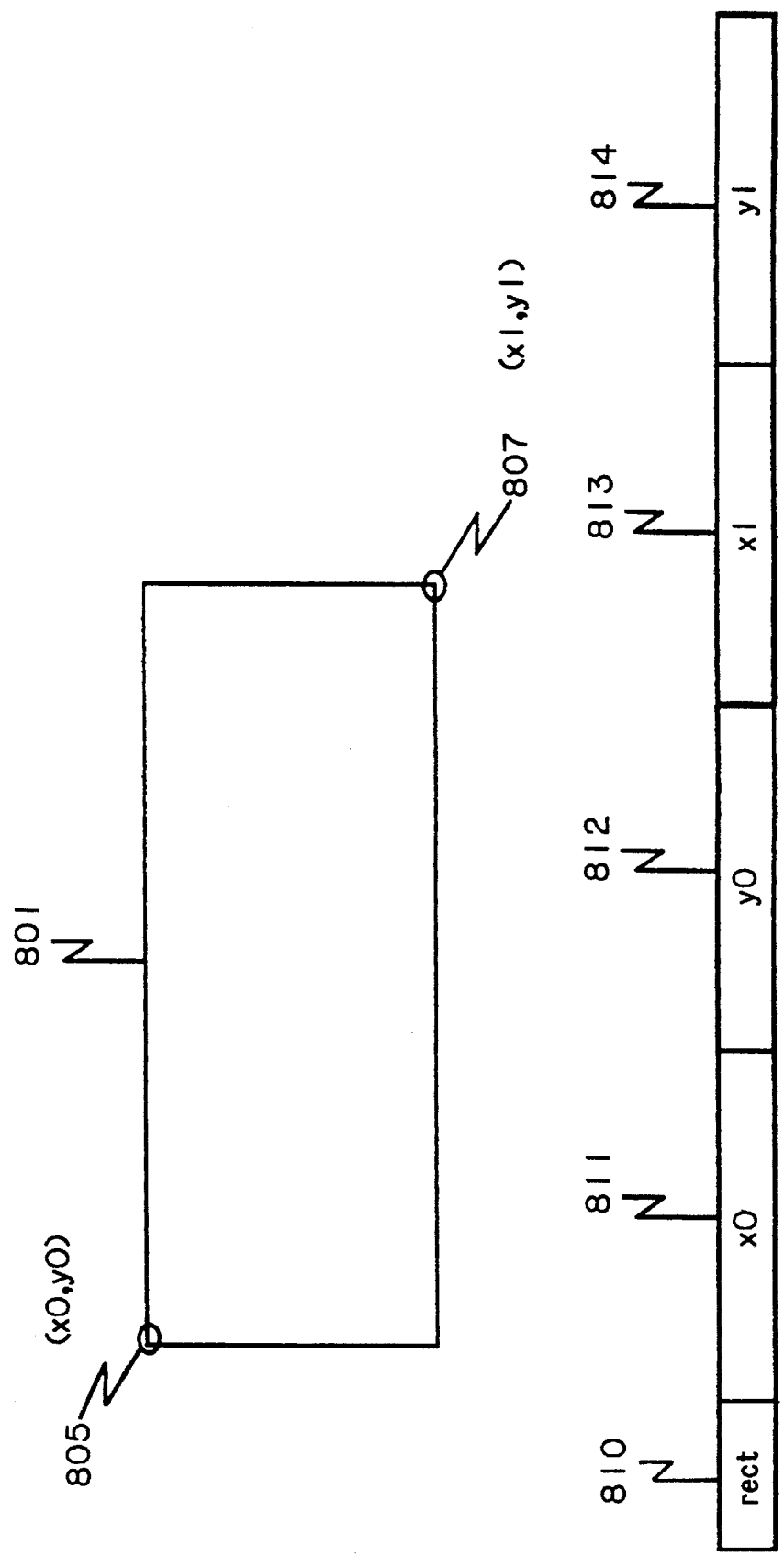
FIG. 8 is a graphic illustration of a message encoding for a rectangular region.

A region can be represented by a set of values, including for example information defining the type of units or type of representation in which the location information is expressed. Thus one value can indicate the type of the region, and based on that value the remaining values describe the region. In a preferred embodiment, there is a division between "simple" and "complex" regions. One type of simple region is a rectangle defined by the coordinates of diagonally opposite comers, as illustrated by region 801 in FIG. 8. The coordinate pair x0,y0 locates the top left comer 805 of rectangle 801 and the diagonally opposite coordinate pair x1,y1 locates the lower right comer 807 of rectangle 801. This information is transmitted as a sequence of values.

Figure 14:
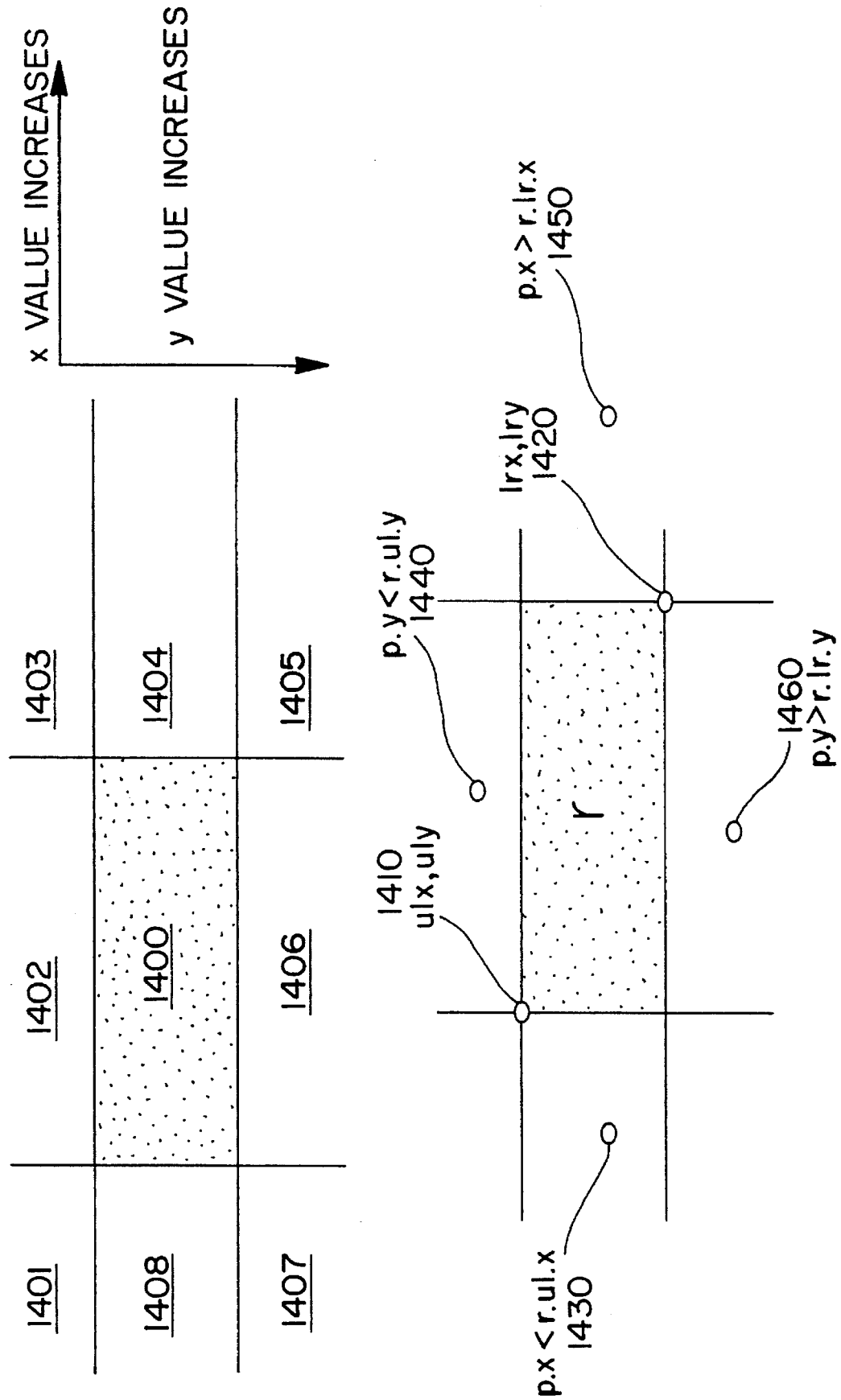
FIG. 14 illustrates how an efficient algorithm for testing inclusion of a point in a rectangular region can be implemented.

In a preferred embodiment, the transmitted data comprises an 8-bit header 810, for example that identifies the data which follows as describing a rectangular region. The four coordinates x0, y0, x1, y1 are transmitted as 32-bit geographic coordinate values 811, 812, 813, 814. Membership of a point, designated p, in a rectangular region, r, is illustrated in FIG. 14. The process for determining membership operates by recognizing that the rectangular region r, i.e., region 1400, is surrounded by eight spaces defined by extending the lines of the rectangle outwards and upwards, logically defining resulting spaces 1401, 1402, 1403, 1404, 1405, 1406, 1407 and 1408. Four simple tests, as shown below, determine quickly whether or not the point is outside the rectangle. If any test shown is true, the point is not in the region; if all tests are false, the point must be in the region. An example of how the procedure can be executed in code is shown in accompanying Listing 1 as the procedure pt_in_rectangle. In the table below, symbol p represents the point; p.x is the x-coordinate of the point and p.y is the y-coordinate of the point. The symbol r represents the region; r.ul is the pair of coordinates defining the upper left corner and p.lr is the pair of coordinates defining the lower right corner. The "example point" designates one of the points illustrated in FIG. 14, namely a point that would result in the test being "true," which therefore indicates that the point is outside the rectangular region r. Each test examines the point for inclusion in three regions, so there is some overlap in the tests.

Comparison Tests for Rectangular Region Inclusion
(See FIG. 14)

| Test performed | Example point | Tests for point in sections |
| --- | --- | --- |
| p.x < r.ul.x | 1430 | 1401, 1408, 1407 |
| p.y < r.ul.y | 1440 | 1401, 1402, 1403 |
| p.x > r.lr.x | 1450 | 1403, 1404, 1405 |
| p.y > r.lr.y | 1460 | 1405, 1406, 1407 |

Another type of simple region is a circle centered on a given coordinate. This is illustrated by circle 901 in FIG. 9. In this embodiment the center 902 of circle 901 is designated x0,y0 and the radius 905 is designated r. The data transmission comprises an 8-bit header 910 which identifies the data that follows as describing a circular region. Coordinates x0,y0 can be transmitted as 32-bit geographic coordinate values 911,912 and radius r can be transmitted as a 32-bit geographic distance 913.

Figure 9:
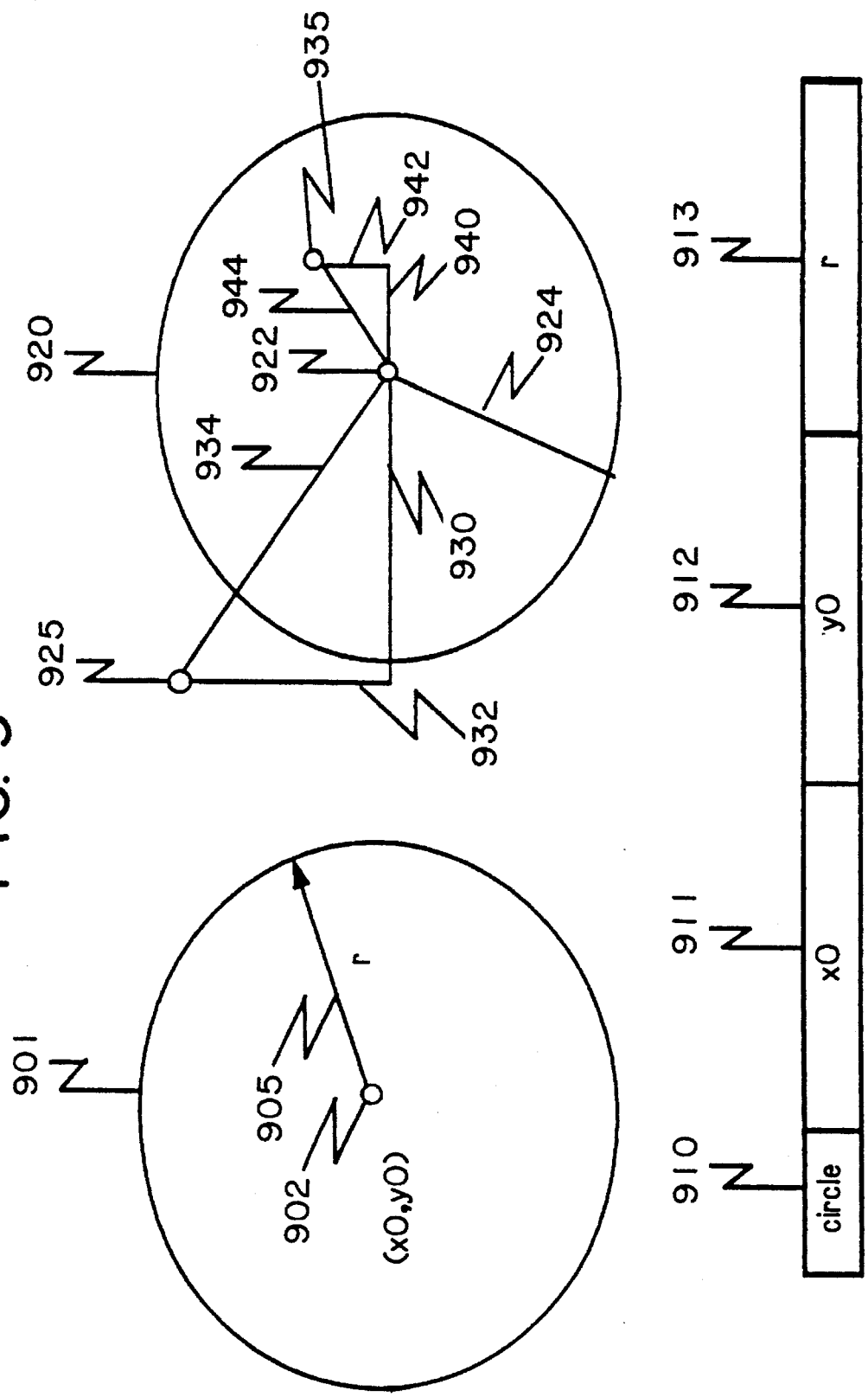
FIG. 9 is a graphic illustration of a message encoding for a circular region, and illustrates the details of an algorithm for determining if a point is contained in a circular region.

A computationally efficient procedure can determine if a point is contained in a circular region. An example of effecting the procedure in code appears in the accompanying Listing 1 as the procedure pt in circle, and is illustrated in FIG. 9. The procedure computes the hypotenuse of a right triangle. Given a designated point 922 at the center of a circle 920 with a given radius 924, the inclusion of a second designated point can be determined by computing the hypotenuse of the right triangle formed by a vertical line which passes through the second designated point and intersects a horizontal line which passes through the center of the circle. Two such cases are illustrated in FIG. 9. In the first example, the second designated point is point 925 and is tested to see whether or not it is inside circle 920 centered on point 922. A vertical line passing through point 925 forms a side 932 of a right triangle. A horizontal line through center 922 forms a second side 930 of the triangle. The length of hypotenuse 934 of triangle 932 is computed by the Pythagorean Theorem as the square root of the sum of the squares of the sides, and this length is compared to the radius. If the computed hypotenuse 934 is longer than the radius 924 of circle 920, the point is outside the circle, which is true for point 925. In the second example, a second designated point 935 is inside circle 920. A similar computation determines the length of hypotenuse 944 of a triangle based on the length of its two sides 940, 942. In this case, hypotenuse 944 is shorter than radius 924 of circle 920, so point 935 is determined to be inside circle 920. For efficient computation, a computationally expensive square root computation can be avoided. The square of the length of the hypotenuse is compared to the square of the radius instead of comparing the length of the hypotenuse to the radius of the circle, which of course yields the same result.

Figure 10:
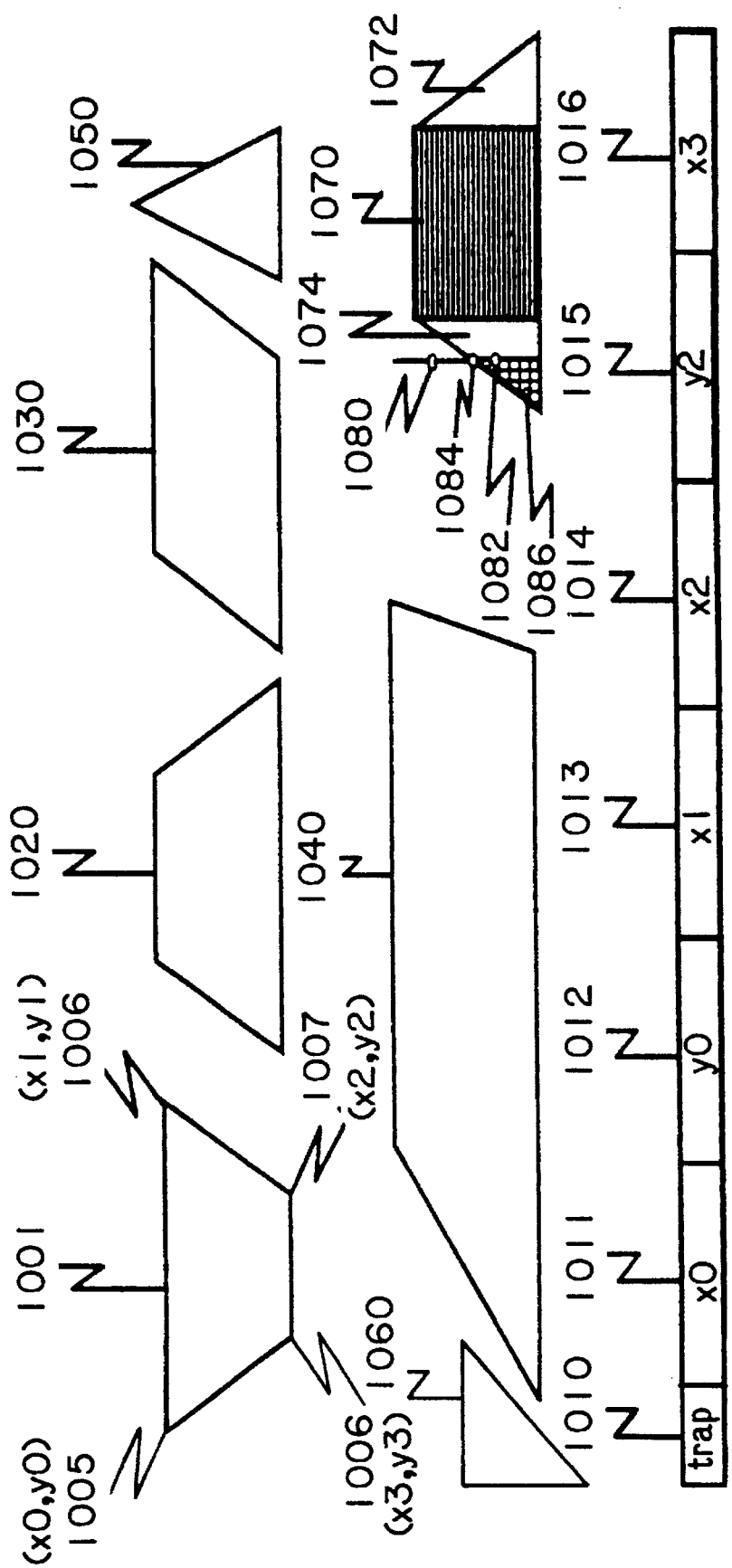
FIG. 10 is a graphic illustration of a message encoding for a trapezoidal region, and illustrates the details of an algorithm for determining if a point is contained in a trapezoidal region.

According to an alternative embodiment, a region can be represented as a trapezoid or parallelogram, or in general as a geometric figure with two parallel and two non-parallel sides, as shown by geometric FIGS. 1001, 1020, 1030, 1040 in FIG. 10. The coordinates of the four corners 1005, 1006, 1007, 1008 can be transmitted as six coordinates, since the coordinates y1 and y3 have the same values as the coordinates y0 and y2. The data transmission thus comprises an 8-bit header 1010 which identifies the data which follows as describing a trapezoidal region. The six coordinates x0, y0, x1, x2, y2, and x3 are transmitted as 32-bit geographic coordinate values 1011, 1012, 1013, 1014, 1015, 1016. A triangular region 1050 in FIG. 10 illustrates a case where x0=x1, and a region 1060 illustrates the case where x2=x3. An encoded procedure for testing for whether or not a point is inside a trapezoid is shown in Listing 1 as the procedure pt_in_trapezoid.

In the pt_in_trapezoid procedure, a point p is tested for inclusion in a trapezoidal region t by decomposing the problem into at most three subproblems. For the first subproblem, the rectangular bounding box of the trapezoidal region is computed. If the point p is outside the rectangular bounding box, it cannot be in the region, and the computation is complete. If the point is within the bounding box, it may not be within the trapezoidal region. The second subproblem then is to compute a rectangular region 1070 based on the coordinates defining the trapezoid. The point p is tested for inclusion in rectangular region 1070 using the previously described rectangular region procedure. If the point is inside region 1070 the computation is complete. If the point is outside the rectangular region, but to its left, a third subproblem is to test the point for inclusion in a triangular region to the left or to the right of rectangular region 1070. This is done by computing a y-intercept point 1084 based on where a vertical line drawn from the point intersects the side of the trapezoid. By well-known geometric construction techniques, the height of triangle 1086 is computed, and the height of this triangle is used to compute the intercept point 1084. In the example, point 1080 has a y-value above point 1084, and therefore is outside triangle 1074, and therefore outside the trapezoid. Point 1082 is below the point 1084 and thus is determined to be inside the triangle and consequently inside the trapezoid. Case analyses for each of the four cases of triangles 1074, 1072, and the corresponding case of trapezoid 1001, are detailed in appended Listing 3.

Figure 11:
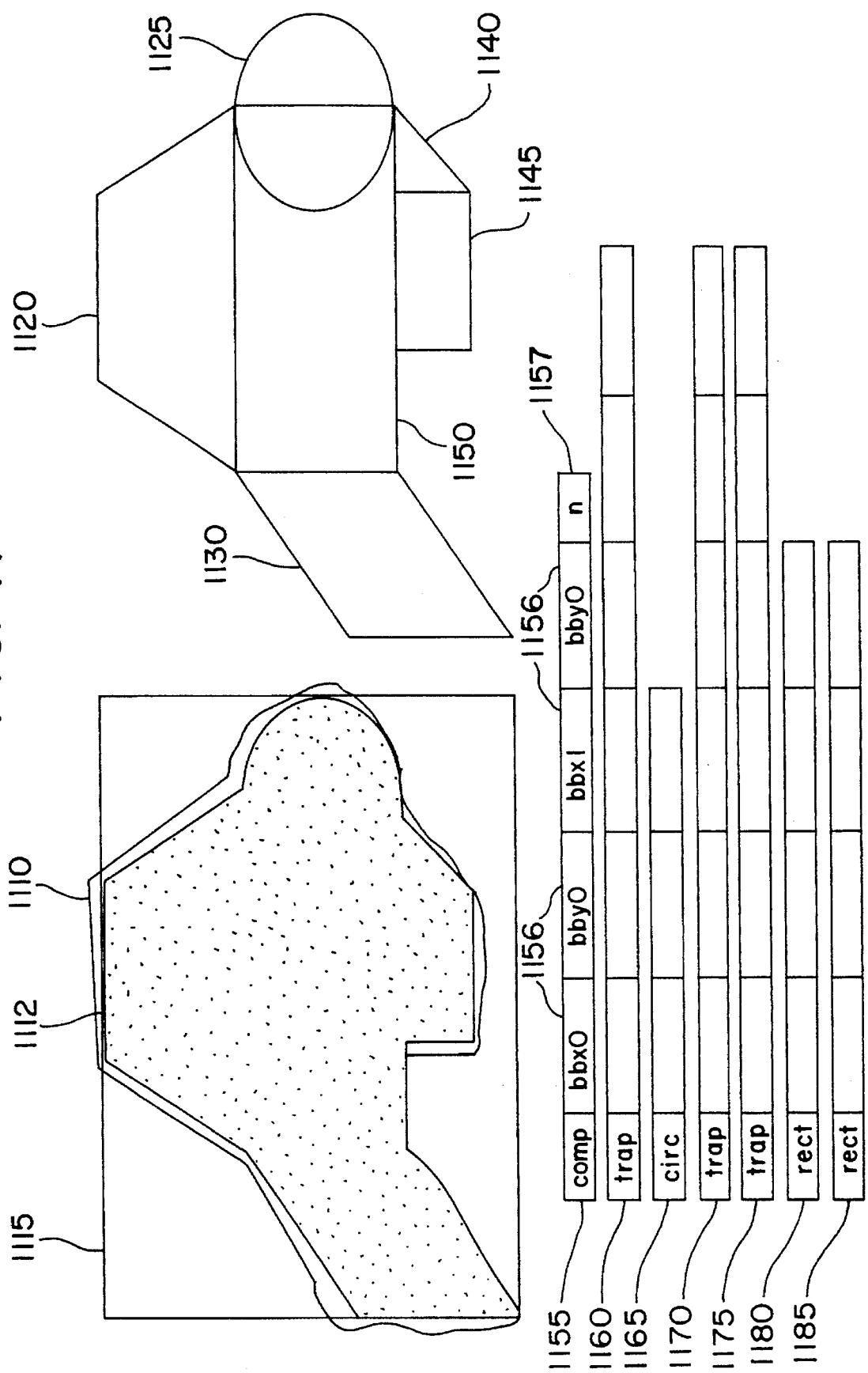
FIG. 11 is a graphic illustration of a composite region which approximates a physical geographic region, and shows how such a composite region is constructed of individual components, as well as illustrating a message sequence which encodes this information.

A geographic region 1110 can be represented as one or more rectangular, circular, or trapezoidal regions forming a "composite region" such as composite region 1112, shown shaded in FIG. 11. The purpose of using composite regions is to enable the representation of irregular geographic entities, which may be appropriate, for example, based upon considerations such as political subdivision, geographic characteristics such as rivers or other natural boundaries, or economic considerations, for example delivery service areas. Area 1110 in FIG. 11 is approximated by a sequence of simple or geometrically more regular regions 1120. 1125, 1130, 1140, 1145, 1150, which are component regions. It is possible to permit two or more component regions to overlap, such as regions 1125.1150. A complex region is transmitted by including a header 1155 that contains an 8-bit code that indicates that the information which follows will define a composite region. This preferably is followed by four 32-bit geographic coordinates 1156 that specify the bounding box 1115 of the composite region. A count value 1157 indicates the number of component regions which define the composite region. Following the header 1155, each of the component regions is transmitted in accordance with the format described above with reference to FIGS. 8.9, and 10. The trapezoidal component region 1120 is transmitted as region definition 1160; the circular component region 1125 as region definition 1165; the trapezoidal component region 1130 as definition 1170; the triangular component region 1140 as definition 1175; the rectangular component region 1145 as definition 1180; and the remaining rectangular component region 1150 as definition 1185. In each case, these definitions specify the type of geometric figure and the necessary, coordinates and/or distances to define them. There is no constraint specified that requires the component regions be transmitted in a specific order, for example in decreasing order of Y-coordinate. In a preferred embodiment, the component regions may be transmitted in a sequence based upon total area covered. Given a selected point, the algorithms previously described are applied to each of the component regions. If the selected point is determined to fall inside any one of the component regions, it is consequently determined to be contained in the composite region.

In the procedure described in Listing 1, the component regions are tested in the same order they are transmitted. According to this technique, it is normally preferable to send the definition of the largest component region first and to order the components by decreasing area. Assuming there are no considerations making it more or less likely that a point will fall into a particular component region (i.e., assuming that the points are uniformly distributed), transmission in order of decreasing area minimizes overall computational effort because once a point is determined to fall within a component region further tests are unnecessary.. However, where appropriate, for example if population density or the like favors a smaller component region, the ordering can be based upon an actual distribution of points in some order of probability. It is preferred that the procedure operate in a predetermined manner that enables the procedure to take advantage of any probabilities embedded in the transmission order. The embodiment shown in Listing 1 exhibits this property.

Figure 13:
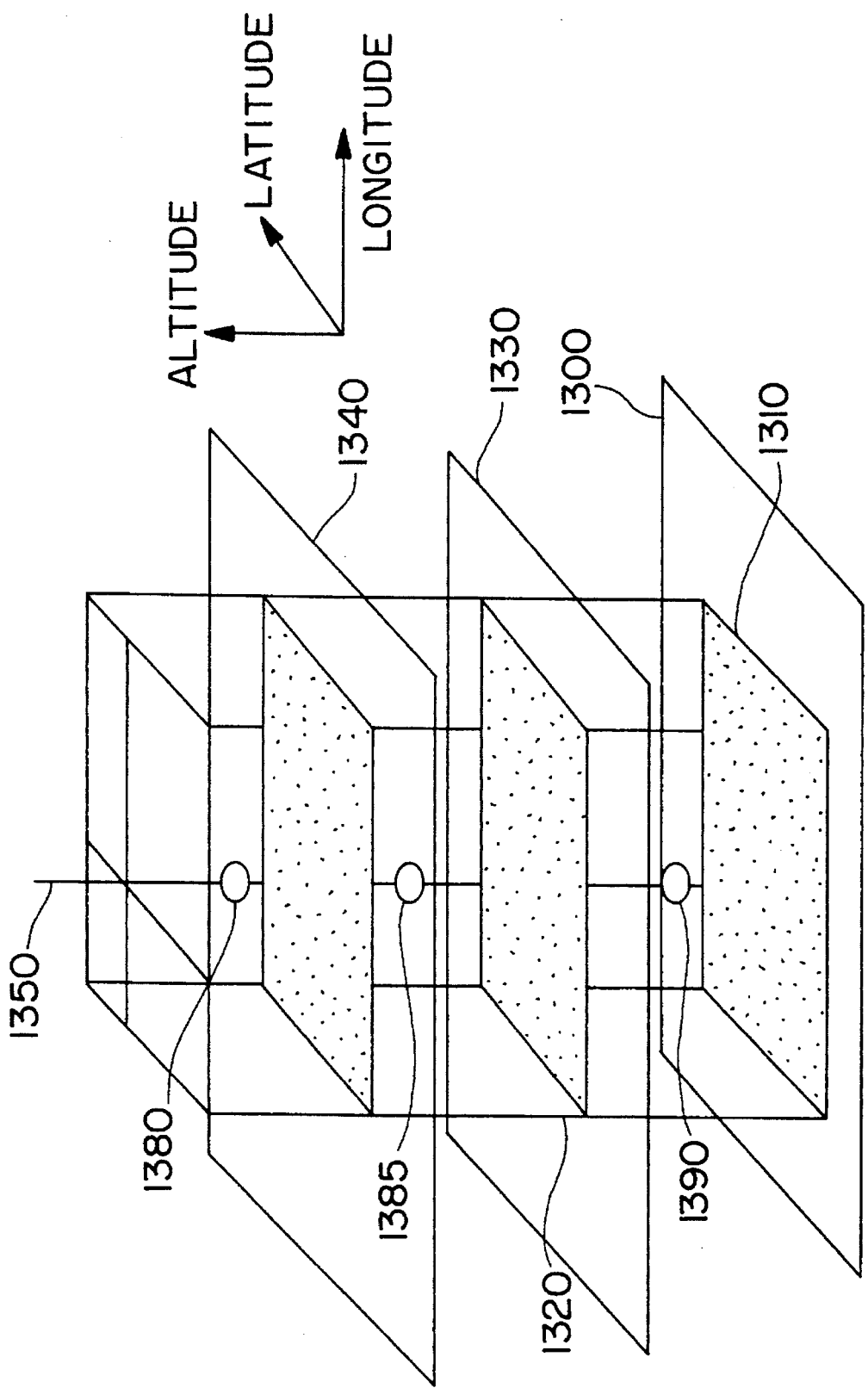
FIG. 13 shows an embodiment of an algorithm for processing information in three dimensions, by adding altitude to the latitude/longitude specification.

Preferably, the determination of membership in a 3-dimensional region is simplified by treating the 3-dimensional problem as a vertical projection of the 2-dimensional planar representation, where two planes bound the upper and lower altitude limits. These planes are modelled as parallel to a nominal plane of the surface, as shown in FIG. 13. In this figure, datum plane 1300 is the nominal plane on which the latitude and longitude coordinates are computed. In a preferred embodiment this plane is referenced to Mean Sea Level (MSL). For purposes of illustration, FIG. 13 uses the example of a simple rectangular region 1310 on the datum plane. A right prismatic projection 1320 is constructed. Distortions introduced by treating the problem as a Cartesian coordinate problem instead of using spherical geometry are normally not significant, and preferably are ignored. The planes of altitude are shown as a lower altitude plane 1330 and an upper altitude plane 1340. A 3-dimensional region of interest is defined as that region defined by prismatic projection 1320 of 2-dimensional region 1310 from the datum plane 1300, bounded by lower altitude plane 1330 and upper altitude plane 1340. A point whose vertical projection 1350 intersects the region in datum plane 1310 is further distinguished by determining its relationship to the planes of altitude. Point 1380 is not in the 3-dimensional region of interest because it is above the upper altitude plane; Point 1390 is not in the 3-dimensional region of interest because it is below the lower altitude plane; and point 1385 is in the 3-dimensional region of interest. Since this procedure involves only two integer comparisons it is quite efficient.

The foregoing examples generally assume a stationary receiver and a fixed region of interest. However, the invention is fully applicable to portable receivers such as in vehicles, and to regions of interest that are defined as a function of time. Other display and readout methods, including for example non-television CRT displays, flat panel displays of all types, or simple digital interfaces can be included. Such devices may provide only audio output as the primary form of output. Such output could be provided as part of an integrated automobile radio, as a separate audio channel, or by using local injection of RF signals to the radio receiver, and provide a means by which traffic conditions, public service alerts, and similar announcements are provided. By use of dynamic global positioning system (GPS) input information, roadside location transmitters, or preprogrammed route information, location data can be received or entered for updating a present location of the receiver. Drivers thus can be selectively targeted for specific messages relating to local conditions and conditions along their impending routes.

For vehicles, a portable geographic reporting unit, such as a Global Positioning System (GPS) unit can be supplemented with an altitude sensing unit to encode elevation data. This position sensing means is coupled to the set-top unit to provide the necessary location information. Another method is to have the information keyed in based upon grid positions and elevation contours read by the user from a map. Unlike the automated method, keyed entry of location information is subject to transcription error, and its accuracy also depends on the availability of accurate maps and an accurate location of the receiver as a point on the map.

The set-top unit includes sufficient data processing capacity to receive and process the digital broadcast information. The set-top unit can be programmed with frequently queried location information or shorthand location keys or codes, such as the user's home or business telephone number or street address, and such location information can form one or more default values which the processor routinely monitors, in addition to any other information which the user chooses to select. The processor can match this location selection information to location designation information included in the incoming data stream or associated with the data stream, deriving latitude, longitude and preferably altitude information from the data stream.

The set-top unit can be programmed to know its geographic location by a variety of means. The Socket Communications Mobile GPS unit (Socket Communications, 2501 Technology Drive, Hayward Calif. 94545) is one such device that can provide this information to the set-top unit. In an exemplary embodiment the receiver is stationary, and consequently needs this information only at setup time. A memory unit can then retain this information. In alternative embodiments, other means may be used to determine the geographic location of the device.

The set-top unit should retain its location information across transient events such as power failures. A non-volatile memory is preferably included for this purpose, such as erasable programmable read-only memory (EPROM), electrically erasable PROM (EEPROM), "Flash EPROM", battery-backed memory, or the like. Battery-backed CMOS memory is a preferred non-volatile storage means.

The invention having been disclosed, a number of variations on the preferred embodiments disclosed as examples will now be apparent to persons skilled in the art. The invention is intended to encompass not only the preferred embodiment, but also a range of variations and equivalents in accordance with the appended claims. Reference should be made to the appended claims rather than the foregoing examples to assess the scope of the invention in which exclusive rights are claimed.

We claim:

1. A method for processing location specific data transmitted on a general broadcast system, comprising:

transmitting a succession of information segments containing information of potential interest to subsets of users of the general broadcast system;

transmitting a plurality of location designation codes with the succession of information segments, each of the location designation codes containing information designating at least one geographical point to which an associated one of said information segments relates;

encoding in a data processor at least a point of interest to a user of the general broadcast system, using at least one geographical coordinate which defines at least one location selection code and is defined at least partly from a user input;

receiving the information segments at a receiver coupled to the data processor, and comparing the location selection code with the location designation code via the data processor to determine an overlap thereof defining at least one particular information segment as an information segment of interest;

processing the information segment of interest for presentation to the user; and, wherein at least one of the location designation codes and the location selection codes for at least a portion of the information segments identifies a plurality of points defining a region, and wherein said comparing includes determining an overlap between the location designation codes and the location selection codes, whereupon the associated information segment is processed.

2. The method for processing location specific data according to claim 1, wherein at least one of the location designation code and the location selection code are represented by an alternate code representing a location.

3. The method for processing location specific data according to claim 2, wherein said alternate code includes at least one of a street address, a telephone number, a postal code, a block designation, a political subdivision and an informal geographic subdivision.

4. The method for processing location specific data according to claim 3, wherein at least one of the location selection code and the location designation code specifies a region having an area, said overlap being determined by at least a part of the other of said at least one of the location selection code and location designation code tailing in the region.

5. The method for processing location specific data according to claim 1, further comprising operating a position reporting device at least temporarily to determine a code representing a location of the user, and entering said code into the data processor to at least partly define said location selection code.

6. The method for processing location specific data according to claim 5, wherein the position reporting device comprises at least one of geographic reporting unit operable to determine longitude and latitude, and an altitude sensing unit operable to determine elevation.

7. The method for processing location specific data according to claim 6, wherein the altitude sensing unit comprises a barometer for providing an air pressure reading to the input means, and further comprising transmitting a normalized ambient pressure in at least one of said information segments, and converting said air pressure reading to an elevation as a function of said air pressure reading and said normalized ambient pressure.

8. The method for processing location specific data according to claim 6, wherein the geographic reporting unit comprises at least one of a Global Positioning System unit and a Long Distance Radio Navigation unit.

9. The method for processing location specific data according to claim 5, wherein the receiver is movable and further comprising sensing the location of the user at least intermittently to at least partly define a varying location selection code.

10. The method for processing location specific data according to claim 1, further comprising filtering the information segment and discarding information segments which are not of interest.

11. The method for processing location specific data according to claim 1, comprising at least one of preferentially storing and preferentially displaying to the user the information segment as a function of a relationship between the location designation code and the location selection code.

12. The method for processing location specific data according to claim 1, comprising transmitting the location designation code to align with the information segments in real time, and further comprising said receiving, comparing and processing of the information segment in real time.

13. The method for processing location specific data according to claim 1, comprising transmitting the location designation code for the information segment in a transmission preceding transmission of said information segment, and referencing said information segment to the location designation code when receiving, comparing and processing the information segment.

14. The method for processing location specific data according to claim 1, wherein at least one of the location designation code and the location selection code defines a plurality of separate locations of interest.

15. The method for processing location specific data according to claim 1, wherein at least one of the location designation code and the location selection code defines a border of a respective region.

16. The method for processing location specific data according to claim 15, wherein the at least one of the location designation code and the location selection code defines a plurality of borders bounding the respective region.

17. The method for processing location specific data according to claim 1, wherein each of the information segments has an individual location designation code.

18. The method for processing location specific data according to claim 1, wherein the location selection code identifies a plurality of locations, and further comprising prioritizing processing of information segments based upon a function of a relationship between the location designation code and the location selection code, for preferentially processing information segments referring to at least one of said locations over others of said locations.

19. The method for processing location specific data according to claim 1, comprising transmitting a succession of location designation codes with the information segments for defining the region.

20. The method for processing location specific data according to claim 19, further comprising processing the location designation codes in the succession in descending order of a probability of overlap of the location selection code with the respective location designation codes.

21. The method for processing location specific data according to claim 20, wherein the location designation codes are ordered by at least one of relative size of regions defined by the location designation codes and relative density within the regions.

22. The method for processing location specific data according to claim 19, wherein said transmitting of the succession of location designation codes further comprises encoding geometric shapes of the portions from a set of shapes, such that the region of interest is a composite of said geometric shapes.

23. The method for processing location specific data according to claim 22, comprising comparing the location designation codes and the location selection code by defining a bounding box and comparing borders of the bounding box with the location selection code.

24. The method for processing location specific data according to claim 23, wherein the bounding box is chosen from the group consisting of a circle, a rectangle, a trapezoid, a sphere, a rectilinear box and a trapezoidal box.

25. The method for processing location specific data according to claim 1, wherein the at least one information segment represents a localized hazard warning.

26. The method for processing location specific data according to claim 1, wherein the at least one information segment represents a localized offer of an opportunity.

* * * * *

UNITED STATES PATENT AND TRADEMARK OFFICE
CERTIFICATE OF CORRECTION

PATENT NO. : 5,565,909
DATED : October 15, 1996
INVENTOR(S) : Thibadeau et al.

It is certified that error appears in the above-indentified patent and that said Letters Patent is hereby corrected as shown below:

Column 10, line 12, "convened" should be -- converted --.

Column 10, line 24, "convened" should be -- converted --.

Column 10, line 30, "pan" should be -- part --.

Column 11, line 34, "son" should be -- sort --.

Column 13, line 19, "pan" should be -- part --.

Column 15, line 39, "pan" should be -- part --.

Column 16, line 13, "comers" should be -- corners --.

Column 16, line 14, "comer" should be -- corner --.

Column 16, line 15, "comer" should be -- corner --.

Column 16, line 16, "comer" should be -- corner --.

Column 16, line 20, "comers" should be -- corners --.

Column 17, line 22, "comer" should be -- corner --.

Column 17, line 23, "comer" should be -- corner --.

Column 17, line 52, "pt in " should be -- pt_in_ --.

Column 18, line 19, "comers" should be -- corners --.

Column 18, line 19, "1005." should be -- 1005, --.

UNITED STATES PATENT AND TRADEMARK OFFICE
CERTIFICATE OF CORRECTION

PATENT NO. : 5,565,909
DATED : October 15, 1996
INVENTOR(S) : Thibadeau et al.

It is certified that error appears in the above-indentified patent and that said Letters Patent is hereby corrected as shown below:

Column 18, line 19, "1006." should be -- 1006, --.

Column 19, line 4, the period between "1120" and "1125" should be replaced with a -- , --.

Column 19, line 7, "1125.1150" should be -- 1125, 1150 --.

Column 19, line 16, "8.9" should be -- 8, 9 --.

Claim 4, column 21, line 66, "tailing" should be -- falling --.

Signed and Sealed this

Ninth Day of December, 1997

*Attest:*

BRUCE LEHMAN

*Attesting Officer*  Commissioner of Patents and Trademarks